(12) United States Patent
Condon et al.

(10) Patent No.: US 7,815,240 B2
(45) Date of Patent: Oct. 19, 2010

(54) MOTOR VEHICLE HAVING A STOWABLE ROOF

(75) Inventors: Alan Richard Condon, Essex (GB); Torsten Gerhardt, London (GB); John K. Harding, Leigh-on-Sea (GB)

(73) Assignee: Ford Global Technologies, LLC, Dearborn, MI (US)

( * ) Notice: Subject to any disclaimer, the term of this patent is extended or adjusted under 35 U.S.C. 154(b) by 39 days.

(21) Appl. No.: 11/962,355

(22) Filed: Dec. 21, 2007

(65) Prior Publication Data

US 2008/0265610 A1   Oct. 30, 2008

Related U.S. Application Data

(63) Continuation of application No. PCT/GB2006/002244, filed on Jun. 20, 2006.

(30) Foreign Application Priority Data

Jun. 29, 2005   (GB) .................... 0513233.7

(51) Int. Cl.
*B60J 7/14* (2006.01)
(52) U.S. Cl. .............. 296/107.17; 296/108; 296/107.16
(58) Field of Classification Search .................. 296/168, 296/107.16, 107.17, 108
See application file for complete search history.

(56) References Cited

U.S. PATENT DOCUMENTS

| | | | | |
|---|---|---|---|---|
| 4,796,943 A * | 1/1989 | Fukutomi et al. | ........ | 296/65.18 |
| 6,921,123 B2 * | 7/2005 | Wagner | ................. | 296/107.17 |
| 7,354,095 B2 * | 4/2008 | Fleming et al. | ........ | 296/107.18 |
| 2002/0079718 A1 * | 6/2002 | Neubrand | ................... | 296/99.1 |
| 2003/0071479 A1 * | 4/2003 | Schaller et al. | ............. | 296/136 |
| 2003/0080580 A1 * | 5/2003 | Obendiek | ............. | 296/107.17 |
| 2004/0174039 A1 * | 9/2004 | Dilluvio | ................ | 296/107.17 |
| 2006/0261630 A1 * | 11/2006 | Fleming et al. | ........ | 296/107.08 |
| 2007/0096500 A1 * | 5/2007 | Corder et al. | ................ | 296/121 |
| 2008/0100090 A1 * | 5/2008 | Riabov et al. | .......... | 296/107.17 |

FOREIGN PATENT DOCUMENTS

| | | |
|---|---|---|
| DE | 3616017 A1 | 11/1987 |
| DE | 4438190 C1 | 11/1995 |
| EP | 1338454 A1 | 8/2003 |

\* cited by examiner

*Primary Examiner*—Jason S Morrow
(74) *Attorney, Agent, or Firm*—Gregory P. Brown; Price, Heneveld, Cooper, DeWitt & Litton, LLP

(57) ABSTRACT

A motor vehicle is provided having front and rear roof panels and which can be moved from in use to stowed positions to change the style of the motor vehicle from a two box style to a convertible or pick-up style. A stowage mechanism for the rear roof panel having two interlinked four bar linkages is disclosed which allows a small linear actuator to produce the range of displacement required to stow the rear roof panel.

17 Claims, 20 Drawing Sheets

MOTOR VEHICLE HAVING A STOWABLE ROOF

CROSS-REFERENCE TO RELATED APPLICATIONS

This is a continuation of International Application PCT PCT/GB2006/002244 with an International Filing date of Jun. 20, 2006.

FIELD OF THE INVENTION

This invention relates to motor vehicles and in particular to a motor vehicle that is transformable from one style of motor vehicle to another style of motor vehicle.

BACKGROUND AND SUMMARY

It is well known to provide motor vehicles of varying styles such as, for example, hatchback, MPV, estate pick-up and convertible.

With recent changes in lifestyle many vehicle purchasers are desirous of having one style of motor vehicle for some uses and an alternative style for other purposes. For example, some people would like to drive a 2 seater open top vehicle for commuting or pleasure but may on other occasions need the space or versatility of an estate car, hatchback or MPV to transport goods, shopping or other more passengers. At the moment people require such different vehicles have to purchase more than one motor vehicle.

It is an object of this invention to provide a motor vehicle that can be converted between one style of motor vehicle and another style of motor vehicle in an economical and simple manner and an improved rear roof panel stowage mechanism for use in such a motor vehicle.

According to a first aspect of the invention there is provided a motor vehicle having a body structure including a rear roof panel which is moveable from an in use position to a stowed position by a pair of stowage mechanisms and at least two rows of seats wherein the rear roof panel is rotated forwardly and moved downwardly as it is moved from the in-use position to the stowed position so that, when in the stowed position, the rear roof is located between two of the at least two rows of seats.

The motor vehicle may have two rows of seats comprising a front row of seats including a seat for a driver of the motor vehicle and a rear row of seats including one or more seats for passengers of the motor vehicle and the rear roof panel, when in the stowed position, may be located between the front and rear rows of seats and overlies the rear row of seats so as to partly obscure them from view.

Each of the stowage mechanisms may comprise first and second elongate arms which are pivotally attached at respective first ends to a respective side of the rear roof panel and are pivotally attached at respective second ends to part of the body structure of the motor vehicle so as to form a primary four bar linkage between the body structure and the rear roof panel and an actuator means driveably attached to one of the first and second arms to reversibly move the rear roof panel between its in use and stowed positions by rotation of the respective arm to which it is attached about its respective second end.

The lengths of the first and second arms of the primary four bar linkage may be such that movement of the rear roof panel from the in use position to the stowed position causes a front edge of the rear roof panel to rotate downwardly as the rear roof panel is moved to the stowed position.

The first and second arms may be connected to the rear roof panel at respective first pivot points and are connected to the body structure at respective second pivot points and the distance between the first and second pivot points of the first arm is less than the distance between the first and second pivot points of the second arm.

The actuator means may comprise a linear actuator and a secondary four bar linkage to driveably connect the linear actuator to said one of the first and second arms.

The secondary four bar linkage may comprise a first drive arm having a first end pivotally connected at a first pivot point to the linear actuator and a second end pivotally connected at a second pivot point to part of the body structure of the motor vehicle, a link arm drivingly connected at a first end to the linear actuator and drivingly connected at a second end to a second drive arm having a first end drivingly connected at a first pivot point to the link arm and a second end pivotally connected at a second pivot point to part of the body structure of the motor vehicle, wherein the distance between the first and second pivot points of the second drive arm is less than the distance between the first and second pivot points of the first drive arm.

The second drive arm may be drivingly connected to the first arm of the primary four bar linkage.

Alternatively, the second drive arm may be formed by a portion of the first arm of the primary four bar linkage.

The actuator means may comprise a rotary actuator or a linear actuator driveably connected to said one of the first and second arms.

The motor vehicle may further comprise a moveable front roof and an area behind the rear row of seats forms a luggage compartment wherein the front roof panel, when in the stowed position, forms a cover for the luggage compartment.

The stowage mechanism for the front roof panel may comprise a pair of elongate arms attached to each side of the front roof panel and a drive means driveably attached to at least one of the pair of arms on each side of the motor vehicle to move the arms and a means to raise the front roof panel to permit the rear roof panel to pass under the front roof panel as it moves from the in use position to the stowed position before the front roof panel is moved to its stowed position.

According to a second aspect of the invention there is provided a method for converting a two box motor vehicle having at least two rows of seats, a moveable front roof panel and a moveable rear roof panel into an alternative style of motor vehicle wherein the method comprises moving the rear roof panel from an in use position to a stowed position in which it is located between two of the at least two rows of seats by rotating it forwardly and moving it downwardly.

The method may further comprise raising the front roof panel from an in use position to a raised position so that the rear roof panel can pass under the front roof panel into the stowed position.

The method may further comprise folding a rear row of seats forward and returning the front roof panel to the in use position to convert the two box motor vehicle into a pick-up style of motor vehicle.

The method may further comprise moving the front roof panel to the stowed position to convert the two box motor vehicle into an open top style of motor vehicle.

The method may further comprise moving the front roof panel to the raised position to permit the rear roof panel to be moved from the stowed position to the in use position.

The method may further comprise moving the front roof panel from the raised position to the in use position after the rear roof panel has moved to the in use position.

BRIEF DESCRIPTION OF THE DRAWINGS

The invention will now be described by way of example with reference to the accompanying drawing of which:—

DETAILED DESCRIPTION

Figure 1:
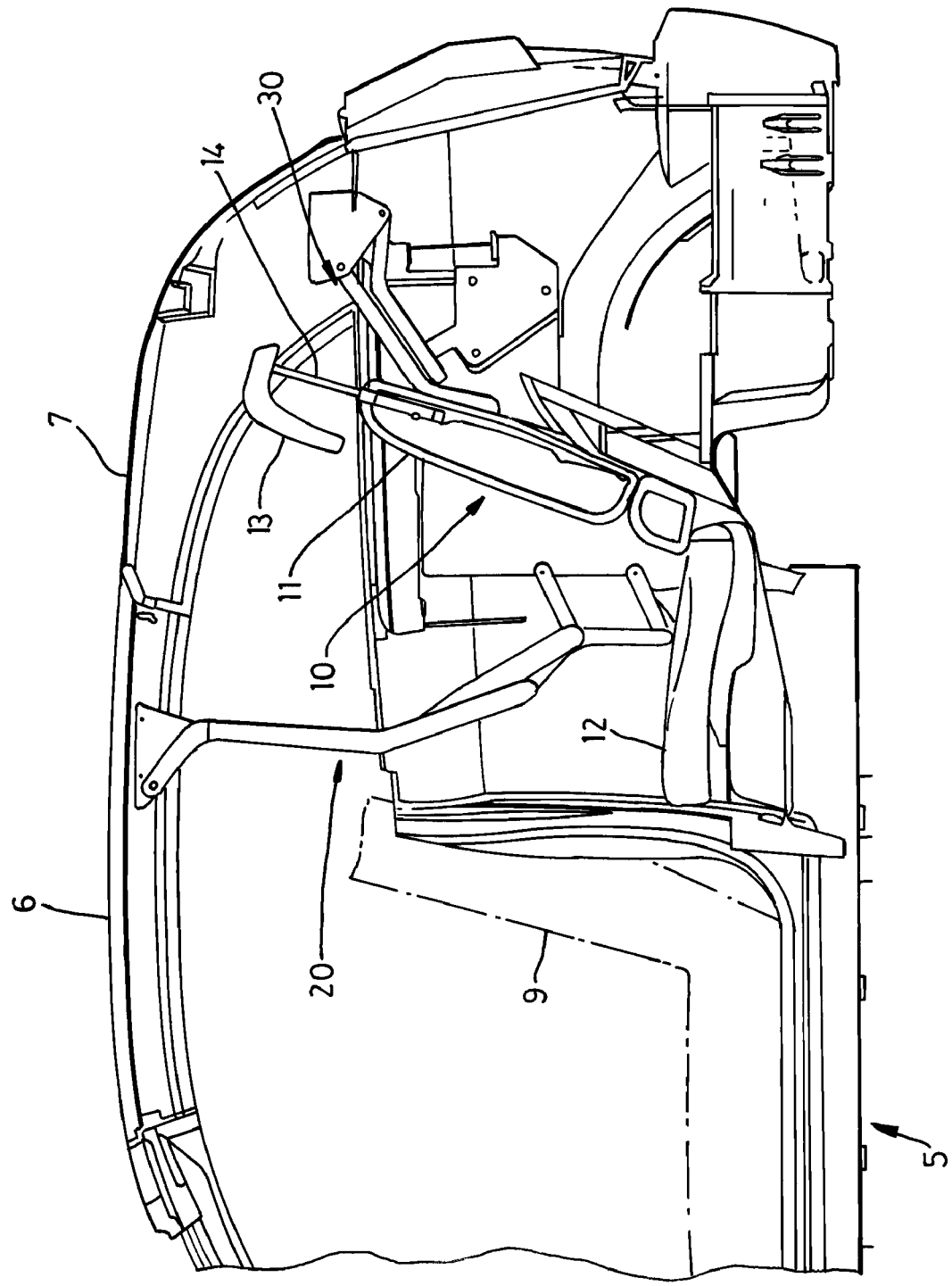
FIG. 1 is a cutaway left hand side view of a rear part of a two box motor vehicle according to the invention, the motor vehicle has front and rear roof members both of which are shown in their 'in use' positions.
Figure 2:
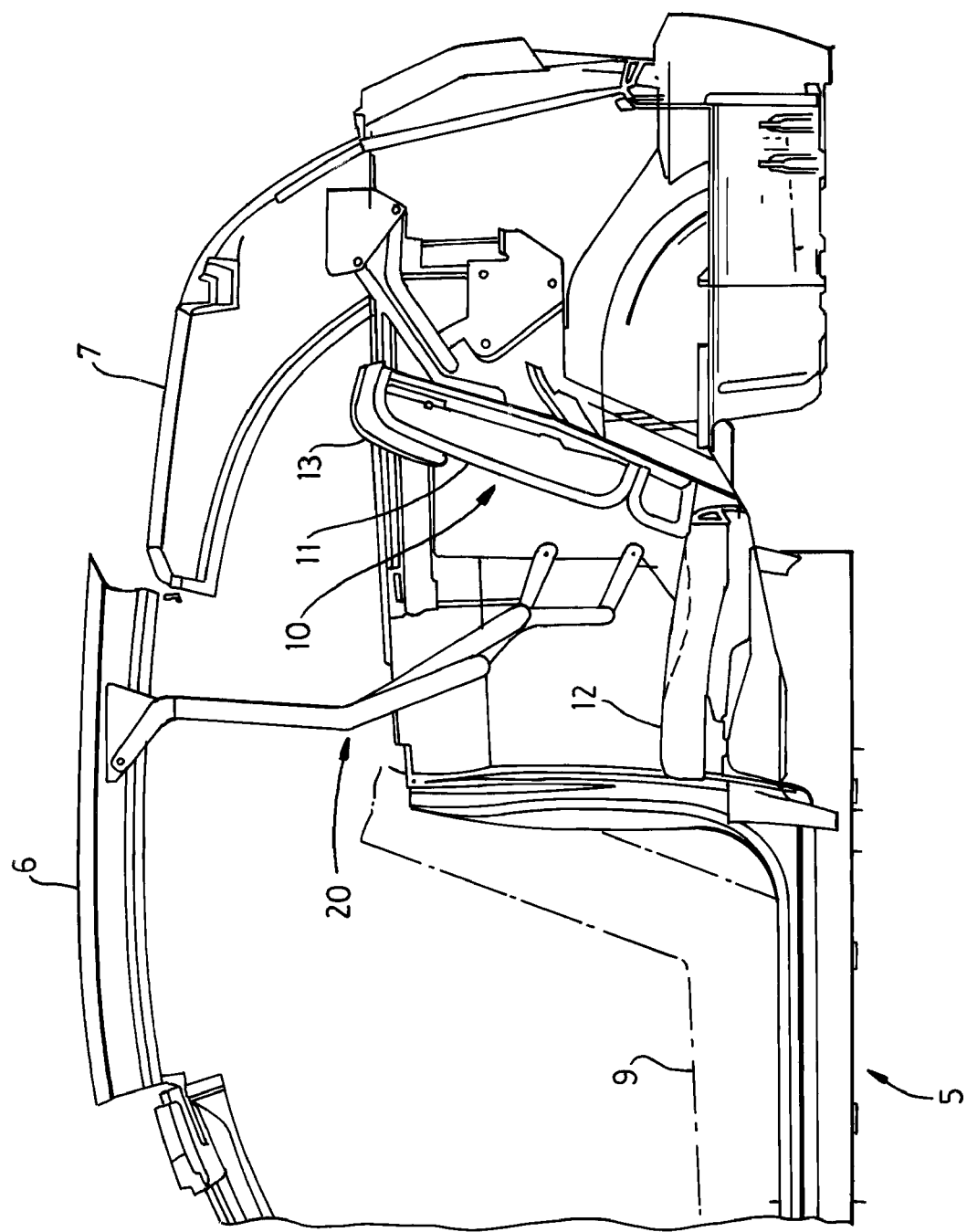
FIG. 2 is a cutaway left hand side view of the motor vehicle shown in FIG. 1 showing the first step in a transformation process from a two box style to a convertible style of motor vehicle.
Figure 3:
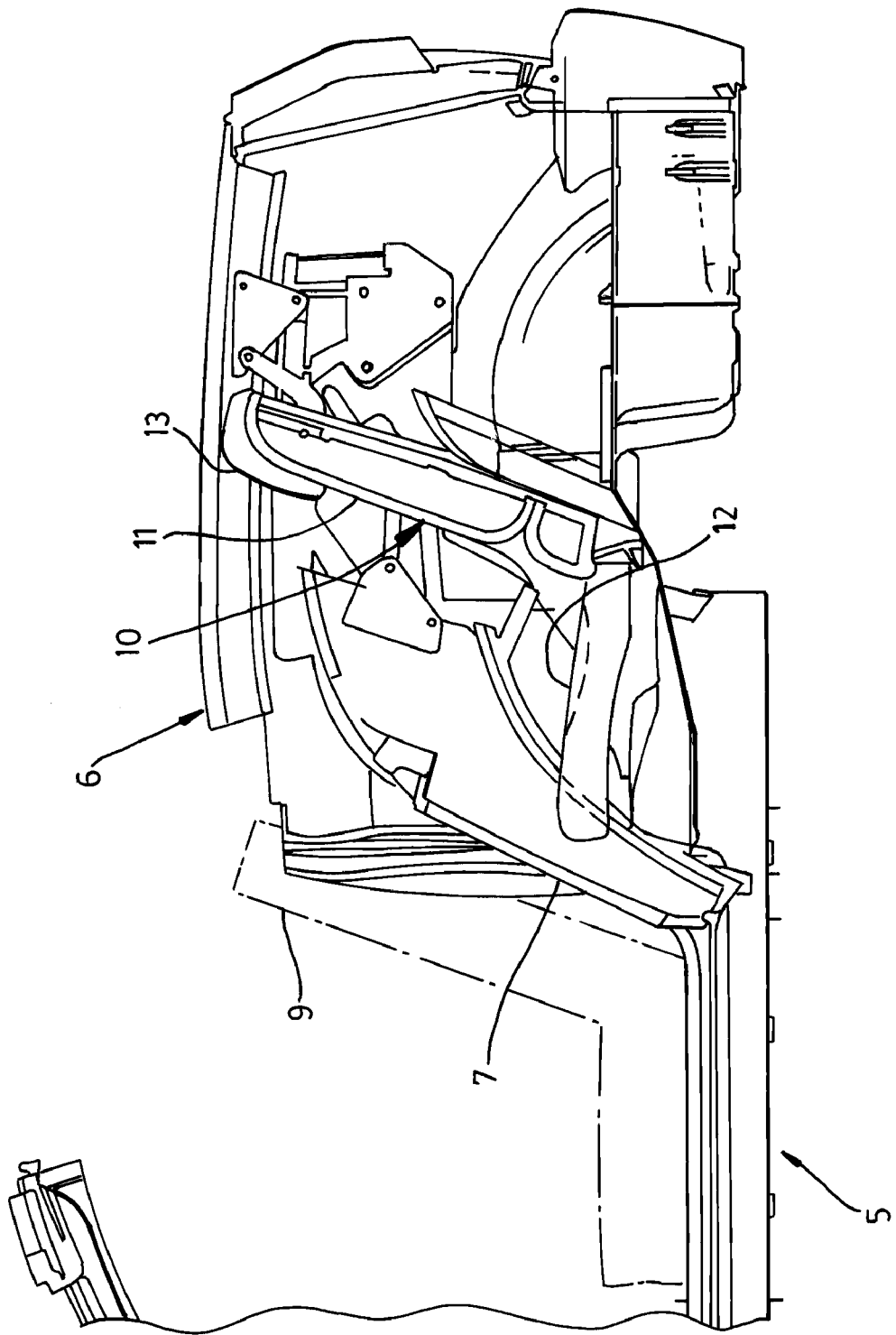
FIG. 3 is a cutaway left hand side view similar to FIG. 2 but showing the front and rear roofs in their stowed positions.
Figure 4:
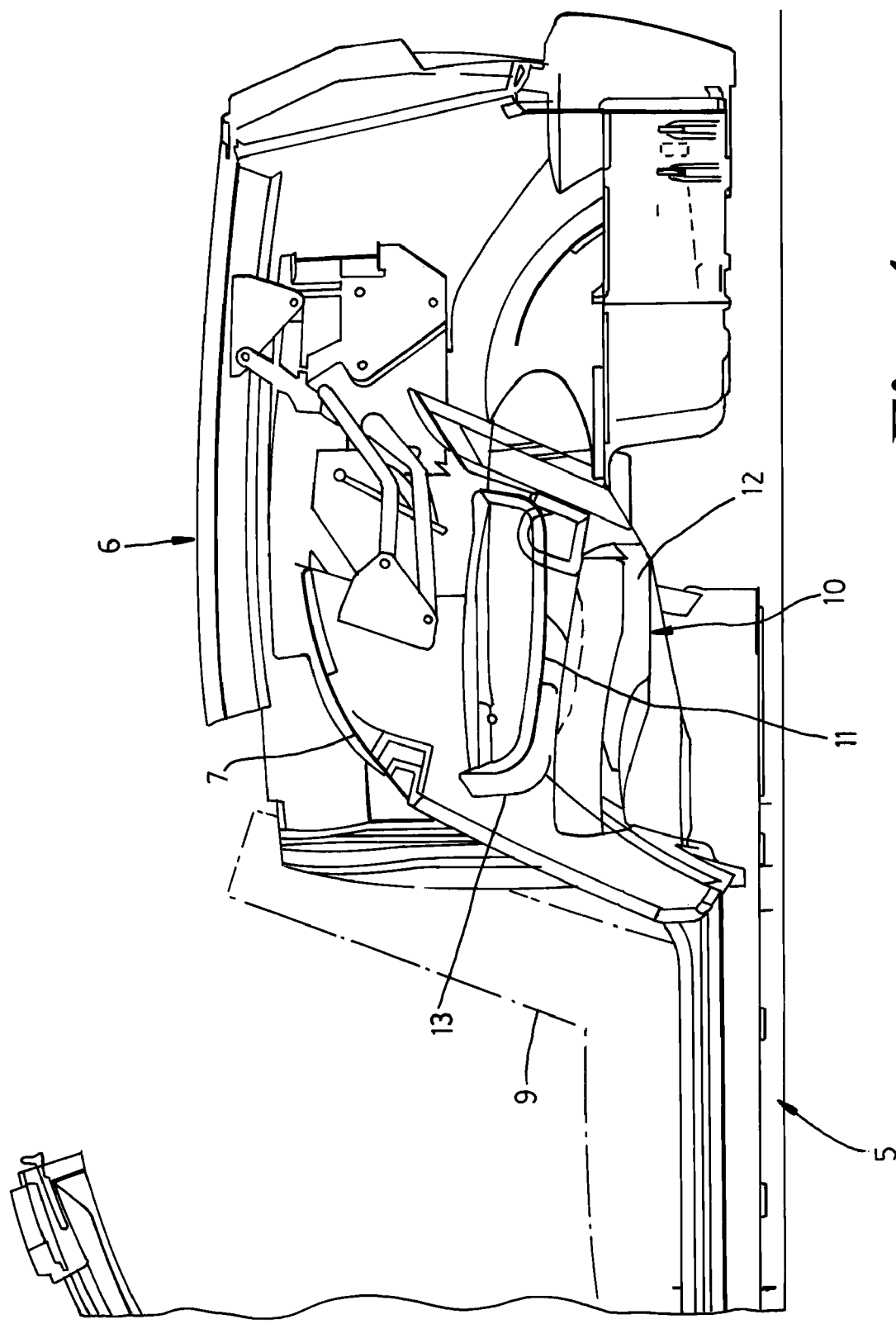
FIG. 4 is a cutaway left hand side view similar to FIG. 3 but showing a rear row of seats folded forward.

With particular reference to FIGS. 1 to 4 there is shown a two box motor vehicle 5 having front and rear stowable roof members or panels 6 and 7 each of which is moveable between an in use position as shown in FIG. 1 and a stowed position as shown in FIGS. 3 and 4. It will be appreciated that when the two roof panels 6, 7 are in their respective in use positions the two roof panels 6, 7 form a cover for a passenger compartment of the motor vehicle 5.

The two box motor vehicle 5 is in this case in the form or style of a hatchback motor vehicle but could also be in the style of an MPV or estate vehicle. It will be appreciated by those skilled in the art that a two box vehicle is one with an engine compartment and a passenger compartment with no fixed bulkhead between the passenger compartment and a luggage storage area at the rear of the motor vehicle 5. The luggage storage area is formed as part of the passenger compartment and the front or rear seats depending upon the number of rows of seats are used as a separator between the passenger compartment and the luggage storage area.

The front roof panel 6 is moveable by means of a front roof stowage mechanism 20 having a number of connected elongate arms of which one is driven by a motive source to move the front roof panel 6 from its in use position to its stowed position and vice-versa. The front roof stowage mechanism 20 is described in greater detail hereinafter with reference to FIGS. 5 to 14.

A rear roof stowage mechanism 30 also having a number of connected arms is used to move the rear roof panel 7 from its in use position to its stowed position and is described in greater detail hereinafter with reference to FIGS. 5 to 9 and 16 and 17.

The motor vehicle 5 has two rows of seats, there is a front row of seats having two seats 9 arranged side by side one of which is for a driver of the motor vehicle 5 and a rear row of seats having in this case two seat assemblies 10 arranged side by side although it will be appreciated that the row of seats could alternatively have three seat assemblies arranged in a row or a single seat assembly if a bench type seat is used.

Each of the seat assemblies 10, of which only one is shown in FIGS. 1 to 4, comprises of a seat cushion 12 and a backrest 11 which are pivotally connected together so that the backrest 11 can fold forward and lie upon the seat cushion 12.

The backrest 11 has an upper edge from which extends a head restraint 13 supported by two rods each of which is slideably supported by part of the structure of the backrest 11 for movement between a raised position in which the head restraint 13 is positioned above the upper edge of the backrest 11 and a lowered position in which the head restraint 13 is positioned adjacent to the upper edge of the backrest 11 or is positioned in a recess formed in the upper edge of the backrest 11.

The rear roof panel 7 includes a lift up rear panel which is pivotally connected at its upper edge to the main structure of the rear roof panel 7 and forms, when the rear roof panel 7 is in its in use position, an upper tailgate to permit objects to be placed in or removed from the luggage storage area. The main body structure of the motor vehicle 5 hingedly supports a drop down flap forming a lower tailgate which can also be used to place or remove objects from the luggage storage area.

The front and rear stowage mechanisms 20, 30 are in this case independently controllable by means of an electronic control unit (not shown). A single switch or driver input device is used to control the movement of both of the roof panels 6, 7 via the electronic control unit.

The electronic control unit is programmed to ensure that the movement of the two roof panels 6, 7 is correctly sequenced to allow the roof panels 6, 7 to be moved from their in use positions to their stowed positions.

From the in use positions shown in FIG. 1 the following method is used to move the two roof panels 6, 7 to their stowed positions.

Firstly, at least a rear end of the front roof panel 6 and in this case the entire front roof panel 6 is raised from its in use position to a raised position as shown on FIG. 2. This is done in order to provide room for the rear roof panel 7 to move and disengages the front roof panel 6 from a seal on the motor vehicle body structure located at a front end of the front roof panel 6 and a seal between the front roof panel 6 and the rear roof panel 7 along a rear end of the front roof panel 6. It will be appreciated that when the front and rear roof panels 6, 7 are both in their in use positions the rear end of the front roof panel 6 overlies a front end of the rear roof panel 7.

The next step in the process is to move the rear roof panel 7 forwardly and downwardly under the rear end of the raised front roof panel 6 into its stowed position. As can be seen with reference to FIGS. 3 and 4 the rear roof panel 7 when in its stowed position is located between the front row of seats 9 and the rear row of seat assemblies 10 and lies just behind the front row of seats 9. It will be appreciated that the rear roof panel 7 is stowed between the two rows of seats even if the rear row of seat assemblies 10 is folded flat.

The next step in the process is to move the front roof panel 6 from the raised position to its stowed position in which it at least partially overlies the stowed rear roof panel 7. The front roof panel 6 is located in its stowed position substantially horizontally to the rear of the front row of seats 9 so that it covers the rear row of seat assemblies 10. Therefore when the two roof panels 6, 7 are in their raised positions they define a four seat hatchback vehicle and when the two roof panels 6, 7 are in their stowed positions they define a two seat open top vehicle.

It will be appreciated that, even when the vehicle is in the convertible style, the luggage area 11 can still be accessed via the lower tailgate and has a similar or the same carrying capacity to the luggage area when the vehicle is in the style of a hatchback motor vehicle.

It will be appreciated that in this case the rear roof panel 7 is moved into its stowed position before the front roof panel 6 is moved from its raised position to its stowed position. However, it would be possible to start the process of moving the front roof panel 6 from its raised position to its stowed position while the rear roof panel 7 is completing its movement to the stowed position.

To reverse the process the front roof panel 6 is first moved from its stowed position to its raised position and the rear roof panel 7 is then moved from its stowed position to its in use position.

However, it will be appreciated that it would be possible to start the process of moving the rear roof panel 7 from its stowed position to its in use position while the front roof panel 6 is completing its movement from the stowed position to the raised position.

The front roof panel 6 is then lowered from its raised position to its in use position.

Because the front and rear roof stowage mechanisms 20 and 30 are independent of one another a further motor vehicle style can be produced.

As before the first step is to move the front roof panel 6 to its raised position as shown on FIG. 2.

The next step in the process is to move the rear roof panel 7 forwardly and downwardly under the rear end of the raised front roof panel 6 into its stowed position.

The next step is to return the front roof panel 6 to its in use position. This has transformed the two box motor vehicle into a pick-up style of motor vehicle the carrying capacity of which can be completed by folding the rear row of seat assemblies 10 forward. The lift up rear panel attached to the rear roof panel 7 can then be opened while the rear roof panel 7 is in the stowed position to provide a wind break behind the front row of seats 9.

With particular reference to FIGS. 5 to 14 there is shown in greater detail the front roof stowage mechanism 20. It will be appreciated that a pair of stowage mechanisms are used to move the front roof panel 6 one on each side of the front roof panel 6. However only the right hand side roof stowage mechanism 20 is shown and described herein.

The front roof stowage mechanism 20 comprises of a first roof support arm 21 pivotally connected at a first or upper end to a bracket 27 fixed to the right hand side of the front roof panel 6. The first roof support arm 21 is pivotally connected at a second or lower end to a moveable support in the form of a slide plate 26. A second roof support arm 22 is pivotally connected at a first or upper end to the bracket 27 and is pivotally connected at a second or lower end to the slide plate 26.

The slide plate 26 is slidingly connected to a guide plate 24 fixed to part of the main body structure of the motor vehicle 5. The guide plate 24 has three elongate slots 28U, 28L and 29 formed in it. The guide slots 28U and 28L are used to guide the motion of the slide plate 26 relative to the guide plate 24 and permit the slide plate 26 to move up and down relative to the guide plate 24 in a substantially vertical direction. Each of the guide slots 28U, 28L has a respective guide pin 40U, 40L engaged with it. The guide pins 40U, 40L are fixed to the slide plate 26 and are a sliding fit in the guide slots 28U, 28L. The slide plate 26 has 1 degree of freedom which is vertical translation and is provide by the engagement of the two guide pins 40U, 40L with the guide slots 28U, 28L.

It will be appreciated that the guide pins could be fixed to the guide plate 24 and the slide plate 26 could have slots formed in it or that some other form of slideable connection could be used between the slide plate 26 and the guide plate 24.

The third or control slot 29 is used to control the rotation of the second roof support arm 22 and has a substantially vertically extending portion and a substantially horizontally extending portion.

A control pin 41 is slidingly engaged with the control slot 29. The control pin 41 is used to attach a piston rod of a linear actuator 25 to one end of a third or link arm 23. The link arm 23 is drivingly connected at its other end to the second roof support arm 22 by means of a common pin 17 to which both of the arms 22, 23 are fastened. The common pin 17 is rotatably supported by the slide plate 26 so as to permit the two arms 22, 23 to rotate relative to the slide plate 26.

One end of the linear actuator 25 is rotatably fastened to part of the main body structure of the motor vehicle 5 and the linear actuator 25 is connected to a source of pressurised fluid such as hydraulic fluid and is a double acting device so that the piston rod is both extended and retracted by fluid pressure. The supply of fluid pressure to the linear actuator 25 is controlled by an electronic control unit (not shown). The linear actuator 25 is positioned such that when the control pin 41 is located in the vertical portion of the control slot 29 retraction of the piston rod will cause the slide plate 26 to be moved upwardly and when the control pin 41 is in the horizontal portion of the control slot 29 retraction of the piston rod will cause the second roof support arm 22 to be rotated in a direction to move the front roof panel 6 in a stowing direction and vice-versa.

Operation of the front roof stowage mechanism 20 is as follows.

Figure 11:
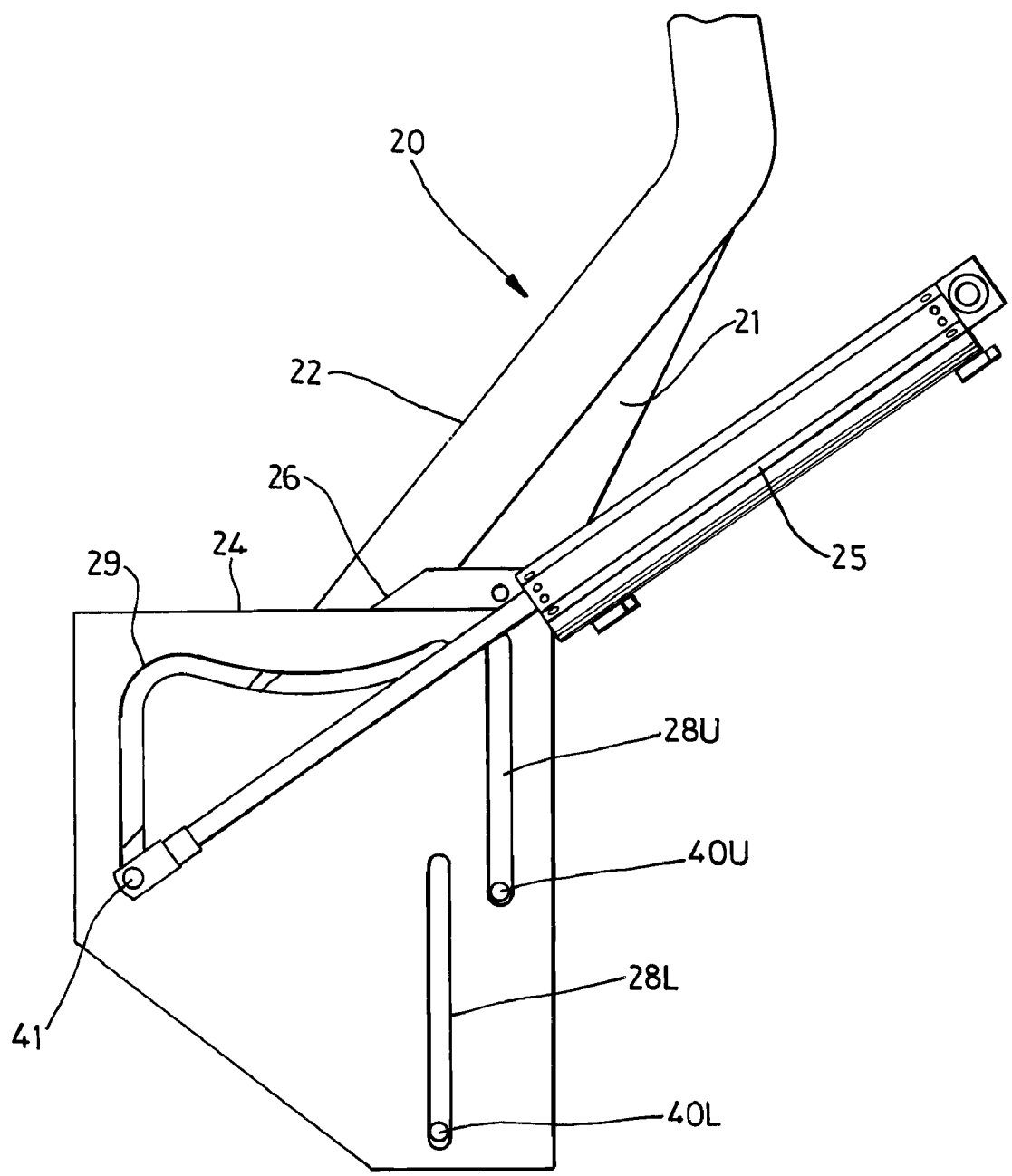
FIGS. 11 to 14 are enlarged views of part of the front stowage mechanism shown in FIGS. 5 to 10 showing a combined lift and rotate mechanism forming part of the front roof stowage mechanism in various positions corresponding to the positions shown in FIGS. 5, 6, 8 and 9.

In FIG. 11 the first and second roof support arms 21 and 22 are shown in the positions corresponding to the front roof panel 6 being in its in use position. The piston rod of the linear actuator 25 is fully extended, the guide pins 40U, 40L are at the lower end of the guide slots 28U, 28L, the control pin 41 is at the lower end of the vertical portion of the control slot 29 and the slide plate 26 is in a lowered position.

When fluid pressure is applied to the linear actuator 25 to retract the piston rod the orientation of the linear actuator 25 at an angle to the control slot 29 and its positioning above the location of the control pin 41 applies a force to the control pin 41 having a vertical component. This will cause the pin 41 to move up the vertical portion of the control slot 29 until it reaches the position shown in FIG. 12. However, because the control pin 41 is fastened to the link arm 23, this upward movement of the control pin 41 causes the slide plate 26 to also be displaced or moved upwardly relative to the guide plate 24 because the link arm 23 is rotatable supported by the common pin 17 which is rotatably engaged in an aperture in the slide plate 26.

Figure 6:
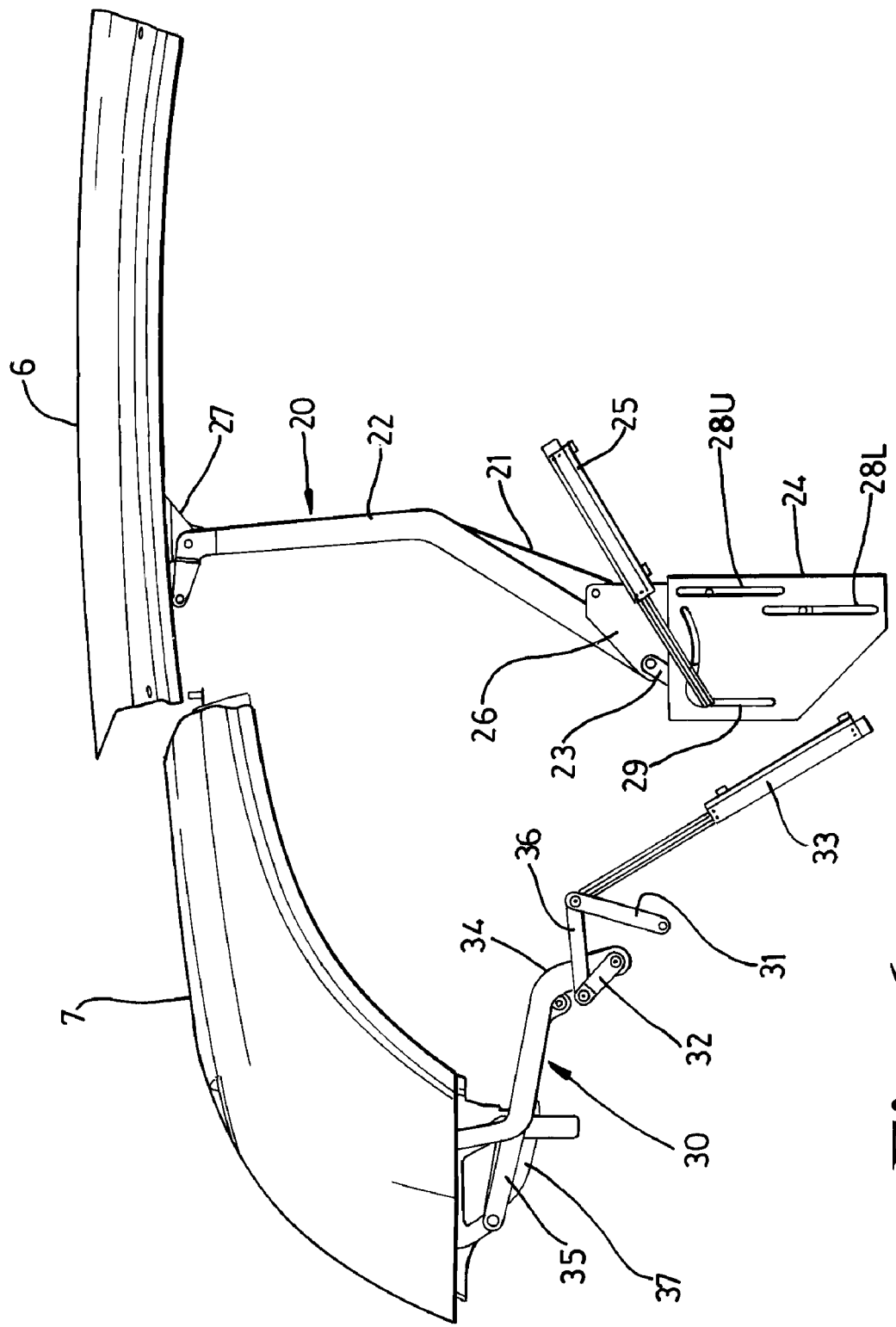
FIG. 6 is a right hand side view similar to FIG. 5 but showing the front and rear stowage mechanisms in the positions they adopt when the front and rear roofs are at the first step of the transformation process shown in FIG. 2.
Figure 12:
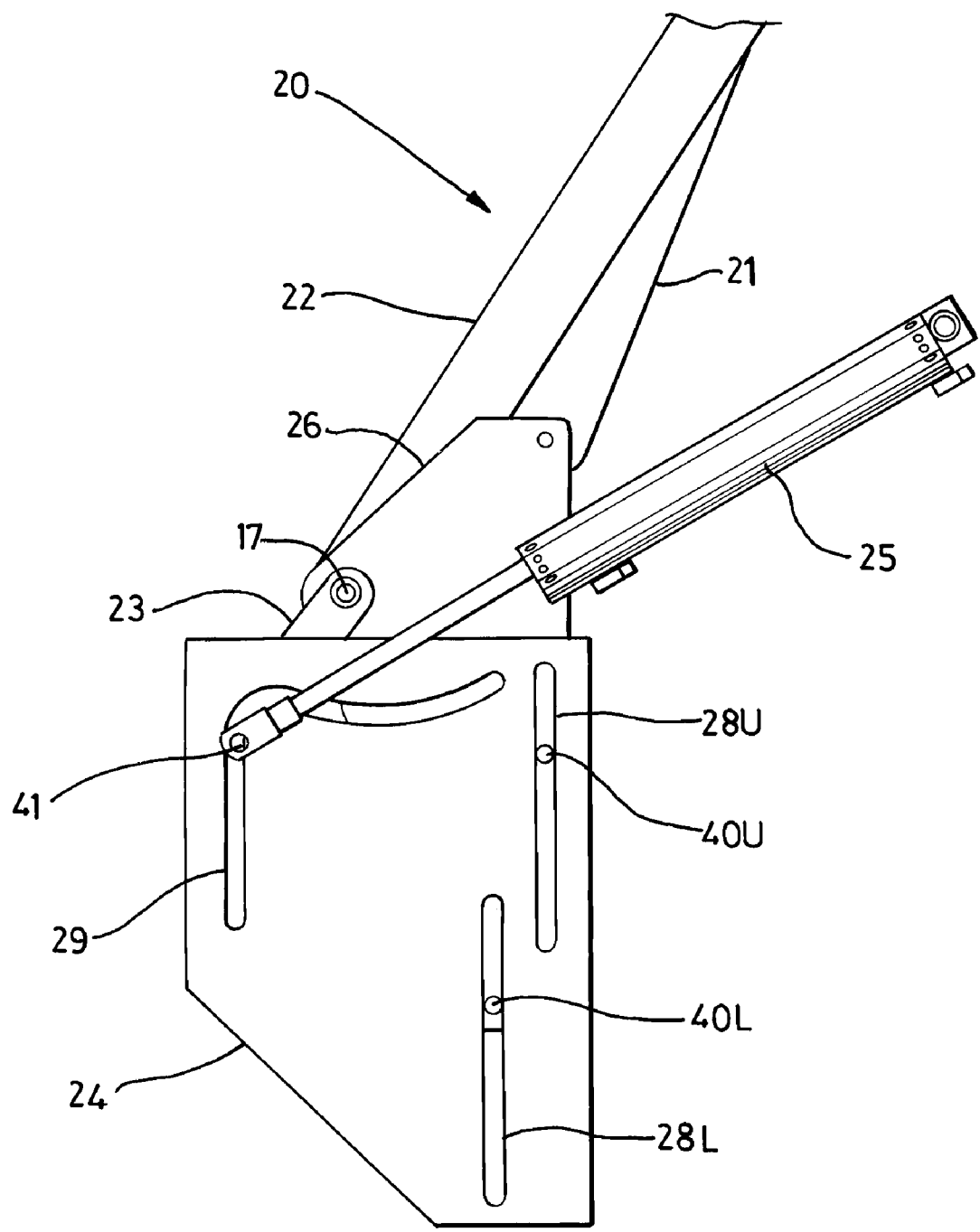

When the control pin 41 is in the position shown in FIG. 12 the piston rod is approximately 66% extended and the slide plate 26 has been raised to approximately 80% of its maximum lift. The front roof panel 6 has also been moved to approximately 80% of its fully raised position (as shown in FIGS. 2 and 6) by this raising of the slide plate 26.

Figure 8:
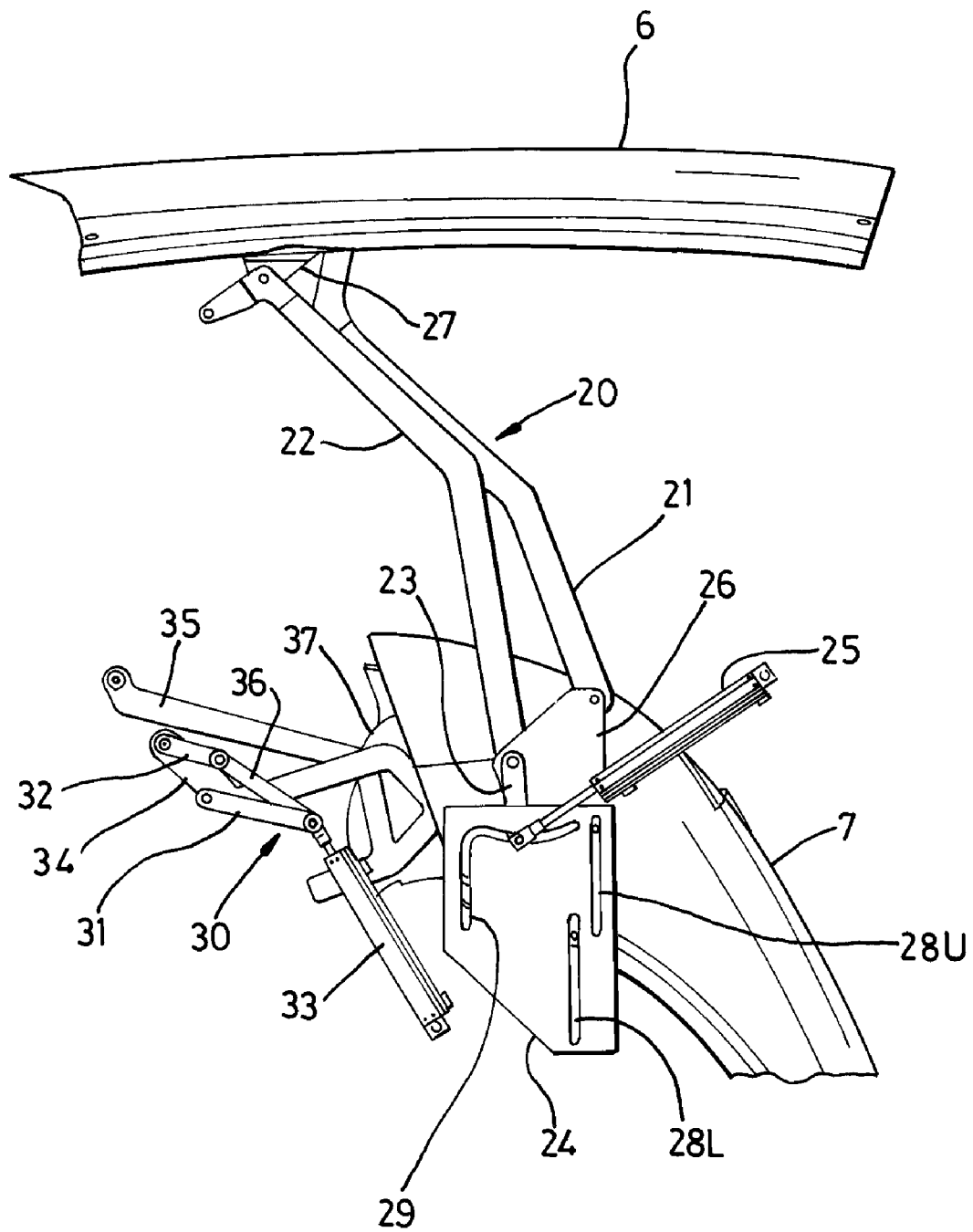
Figure 13:
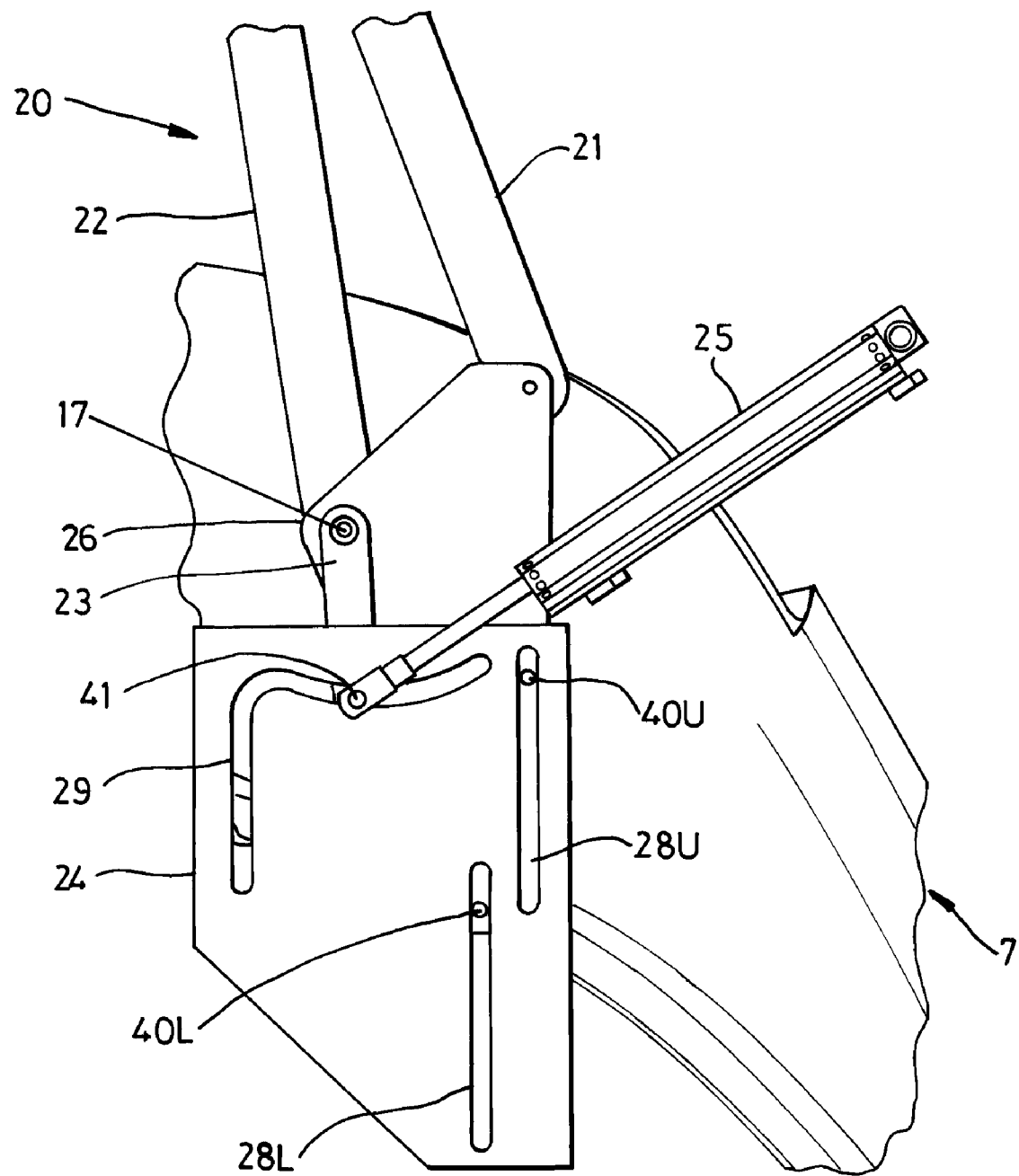

As the piston rod is further retracted the control pin 41 traverses around a curved path linking the vertical and horizontal portions of the control slot 29 until when it reaches the position shown in FIG. 13 the piston rod is approximately 33% extended, the slide plate 26 has reached 100% lift and the front roof panel 6 is fully raised as shown in FIG. 8. This extra lift is due to rotation of the link arm 23 from an inclined position to a position where the common pin 17 is positioned at its maximum vertical distance above the control pin 41. During this motion around the curved path from the vertical portion of the control slot 29 to the horizontal portion of the control slot 29 the rotation of the link arm 23 will produce a corresponding rotation of the second roof support arm 22 to which it is drivingly connected by the common pin 17 and the first roof support arm 21 will be rotated as a consequence of the rotation of the second roof support arm 22. The front roof panel 6 will therefore have moved from the raised position to a position between the raised position and its stowed position.

Figure 9:
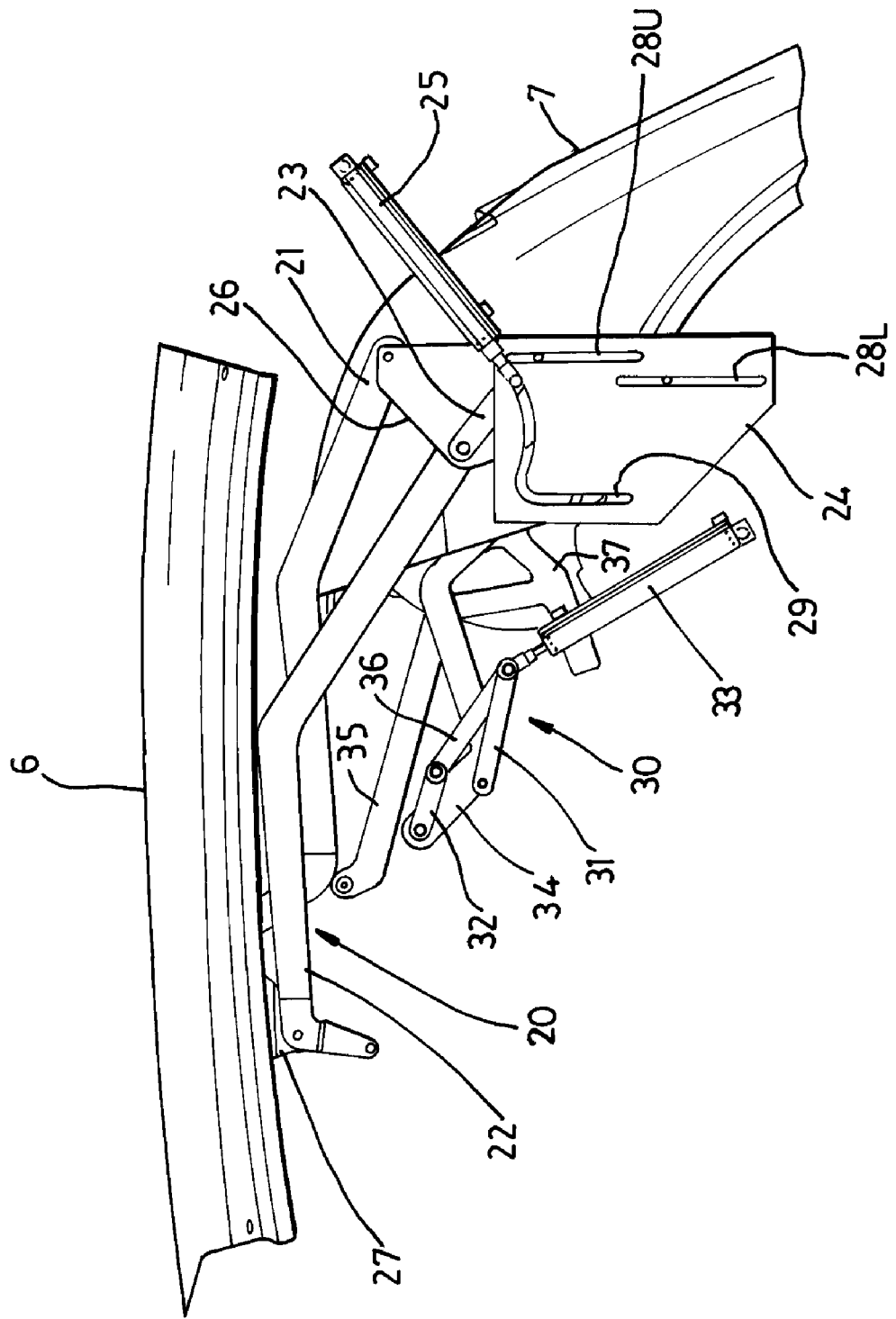
FIG. 9 is a right hand side view showing the front and rear stowage mechanisms in the positions they adopt when the front and rear roofs are in their stowed positions as shown in FIGS. 3 and 4.
Figure 10:
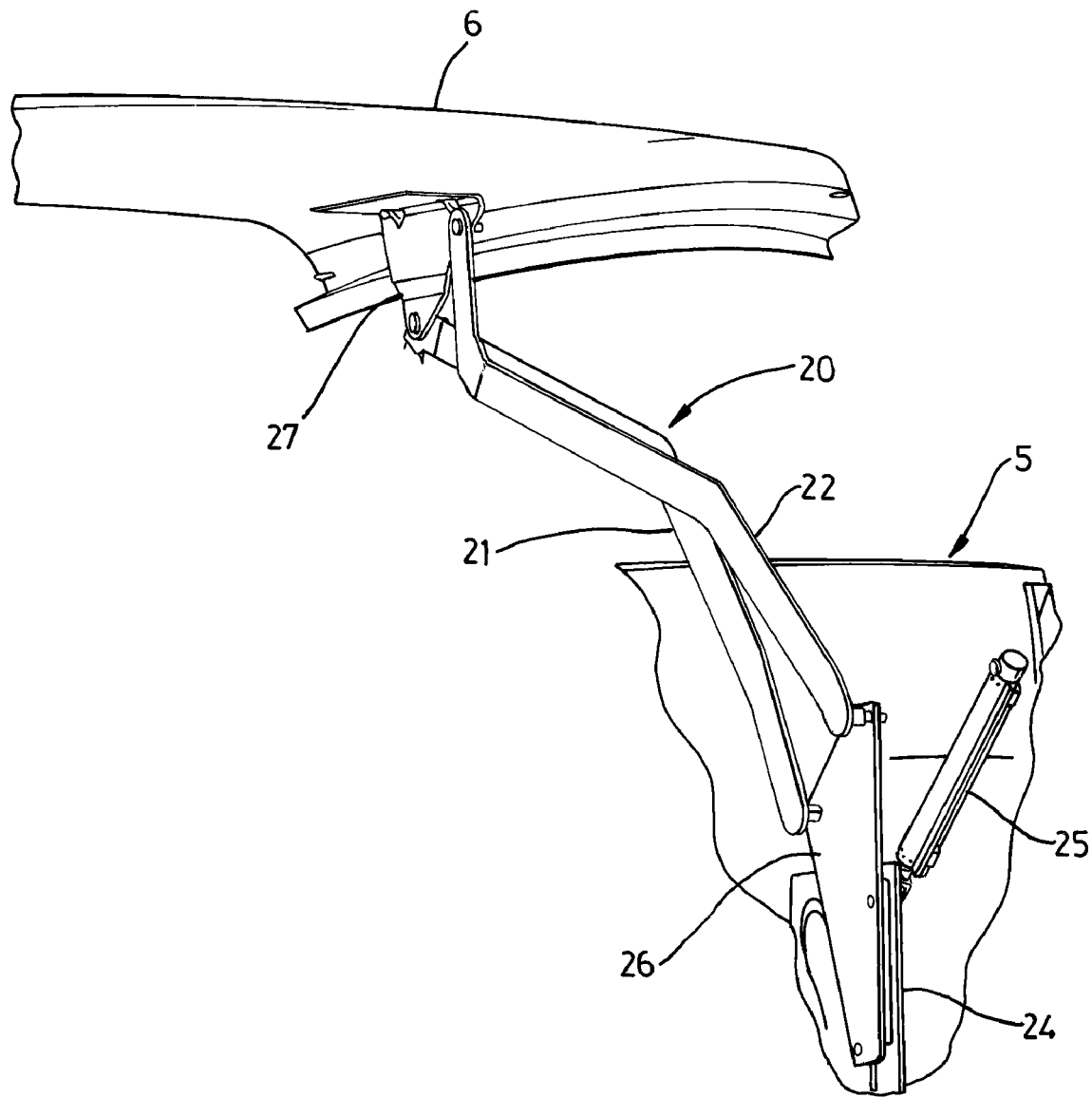
FIG. 10 is a three quarter rear view of the right hand side front stowage mechanism shown in FIGS. 5 to 9 showing the stowage mechanism as it would appear at the first step shown in FIG. 6.
Figure 14:
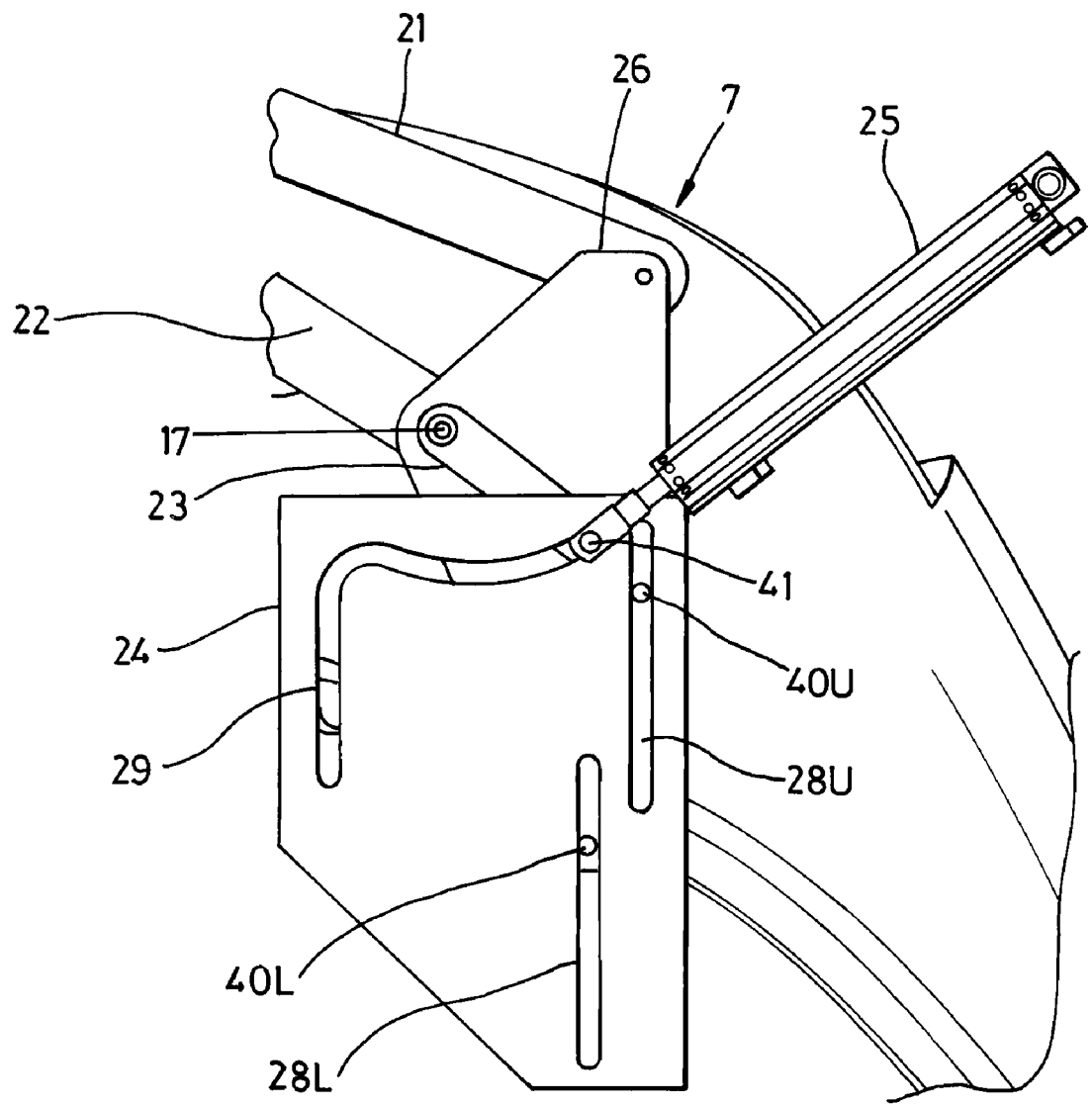

From this position further retraction of the piston rod will cause the control pin 41 to move further along the horizontal portion of the control slot 29 until the piston rod is fully retracted as shown in FIG. 14. At this position the slide plate 26 is approximately 90% raised due to the further rotation of the link arm 23. During this motion the control pin 41 follows an upwardly curving path defined by the control slot 29 which decreases the friction between the control pin 41 and the control slot 29 and aids rotation of the link arm 23. The further rotation of the second roof support arm 22 produced by this motion moves the front roof panel into its stowed position as shown in FIGS. 3, 4 and 9.

The respective lengths of the first roof support arm 21 and the second roof support arm 22 is such that the front roof panel 6 is maintained in substantially the same orientation throughout the motion from the in use position to the stowed position and so the front roof panel 6 when in the stowed position is positioned substantially horizontally if the motor vehicle 5 is resting upon a horizontal surface.

It will be appreciated that the process is fully reversible from this stowed position by the electronic control unit energising the linear actuator 25 to produce extension of the piston rod.

Although in the embodiment shown both of the roof support arms 21, 22 are pivotally connected to the slide plate 26 and the entire front roof panel 6 is raised it will be appreciated that it would be possible to pivotally connect only the second roof support arm 22 to the slide plate 26 so that only the rear end of the front roof panel 6 is raised provided the seal used at the front of the front roof panel 6 is suitably constructed to permit rotation about the front end of the front roof panel 6 and separate actuators are used to raise the slide plate 26 and rotate the first roof support arm 21.

One advantage of the front roof stowage mechanism described above is that a single relatively small actuator is used to produce both raising of the front roof panel 6 and its subsequent movement to the stowed position.

Figure 15A:
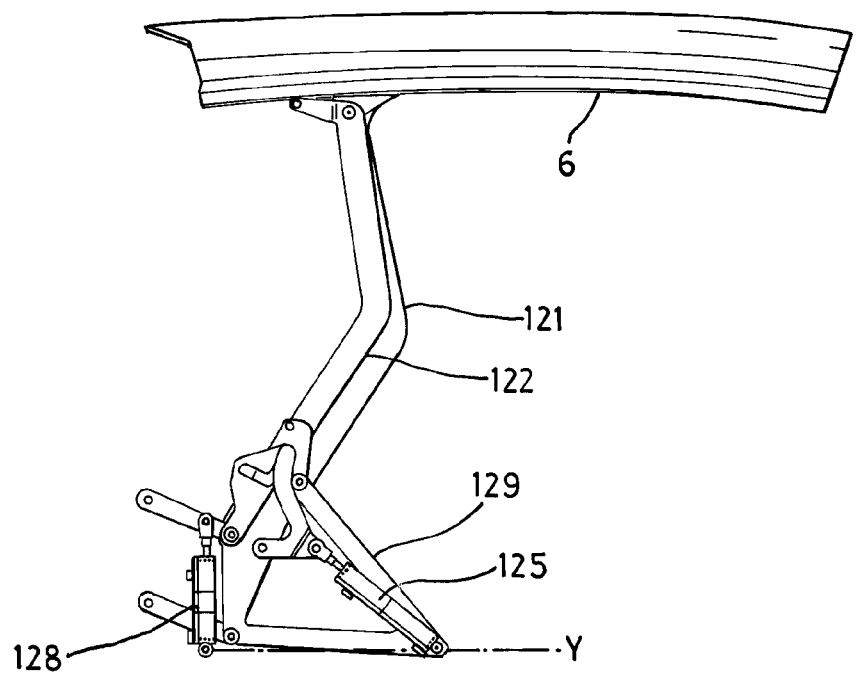
FIGS. 15A and 15B are right hand side views showing an alternative front roof stowage mechanism in positions corresponding to FIGS. 1 and 2.
Figure 15B:
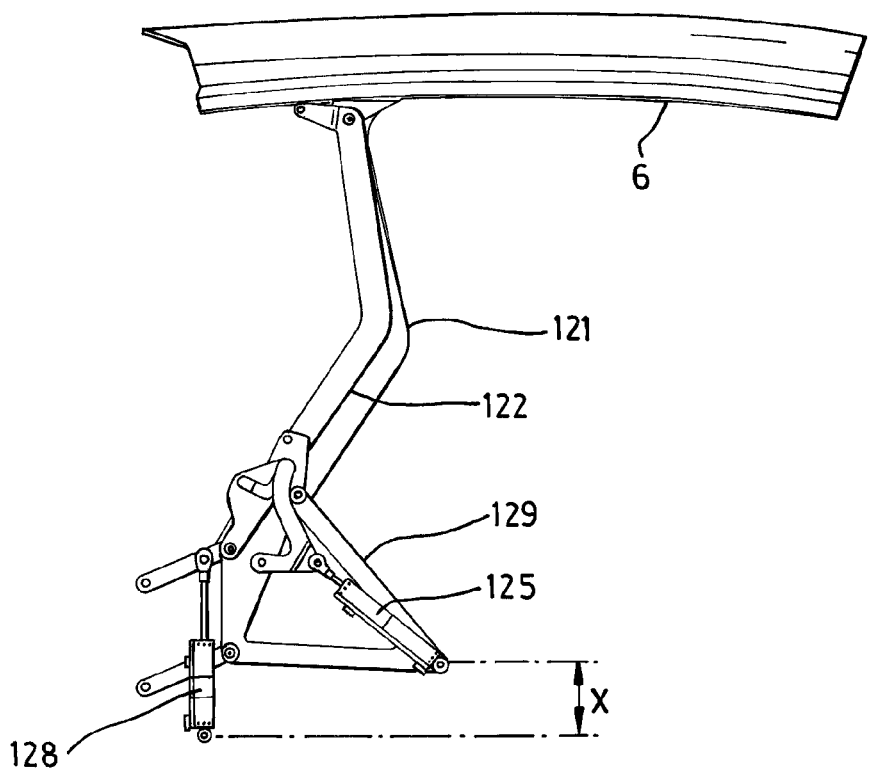

With reference to FIGS. 15A and 15B there is shown a front roof stowage mechanism that is intended to be a direct replacement for that previously described and in many respects is the same as that previously described.

As before the stowage mechanism comprises of a first roof support arm 121, a second roof support arm 122 and a first linear actuator 125 connected to the second roof support arm 122 to produce rotation of the second roof support arm 122. However with this embodiment the moving of the front roof panel 6 to the raised position is performed by a second linear actuator 128. The second linear actuator 128 is fastened to part of the main body structure of the motor vehicle 5 and has a piston rod connected to a support frame 129. The first linear actuator 125 has one end fastened to the support frame 129.

As shown in FIG. 15A when the piston rod of the second linear actuator 128 is retracted the support frame 129 is in a lowered position and the position of connection of the second actuator 128 to the main body structure is on a common plane 'Y' to the position of attachment of the first linear actuator 125 to the support frame 129 and the front roof panel 6 is in the in use position.

When the piston rod of the second linear actuator 128 is extended it raises the support frame 129 and so the first linear actuator 125 is also raised. The distance the first linear actuator 125 is raised is indicated on FIG. 15B by the reference letter 'X'. This will cause the front roof panel 6 to be raised from the in use position to the raised position.

From this position all that is required is to retract the piston rod of the first linear actuator 125 to cause the front roof panel 6 to be moved to its stowed position.

One advantage of this arrangement is that the vertical movement of the front panel 6 is separate from the rotation of the front roof panel 6 to its stowed position. This allows the front roof panel to be simply raised to allow the rear roof panel 7 to be stowed and then lowered back into its in use position by simply operating only the second linear actuator 128. Such an action is useful if the motor vehicle 5 is to be transformed into a pick-up style of motor vehicle in which the front roof panel 6 is in its in use position and the rear roof panel 7 is in its stowed position.

It will be appreciated that other mechanisms could be used to produce the lift and rotate actions required for the front roof stowage mechanism and those described above are merely preferred embodiments.

Figure 16:
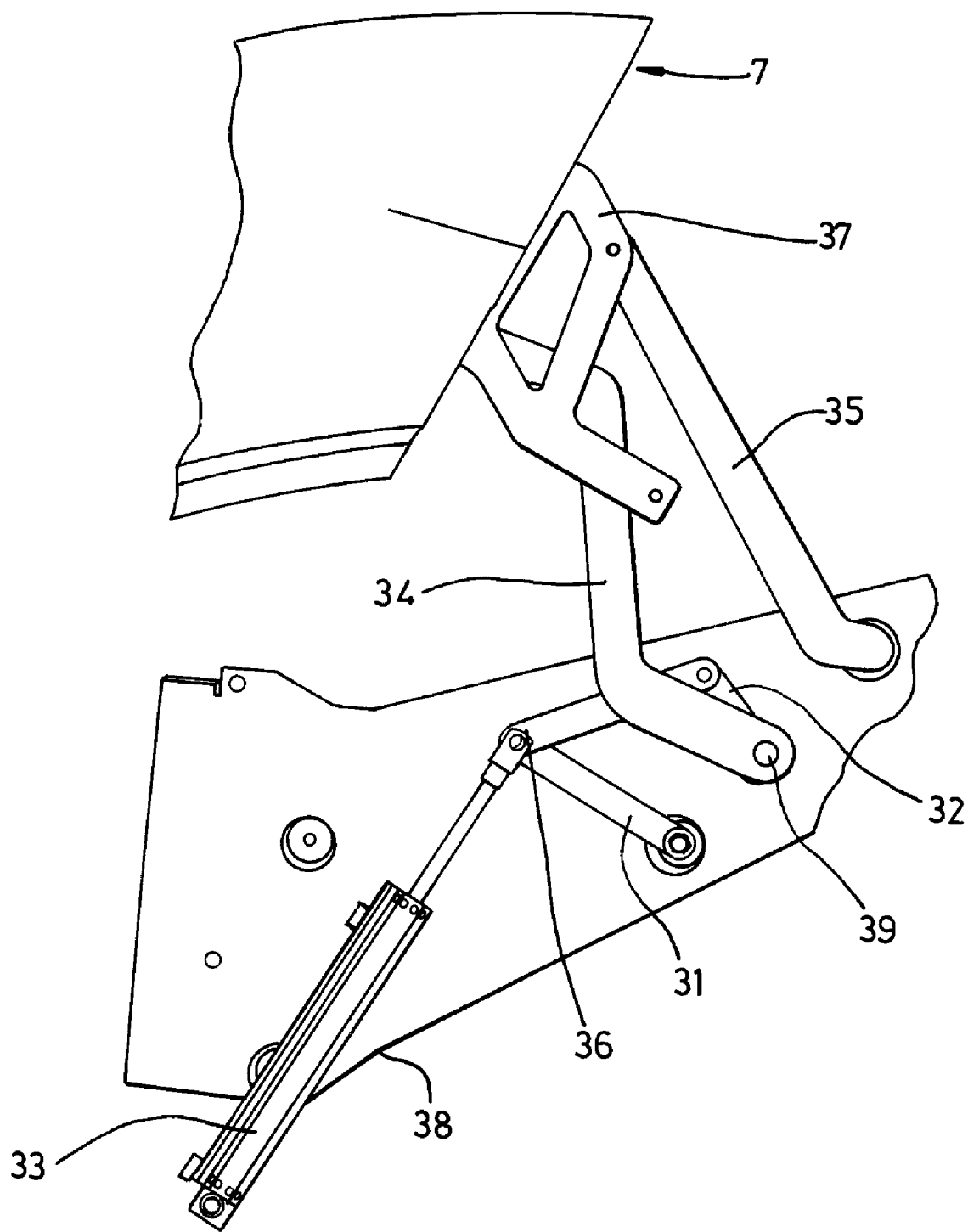
FIG. 16 is a left hand view of the right hand rear roof stowage mechanism shown in FIGS. 5 to 9 showing the stowage mechanism in a partly stowed position.
Figure 17:
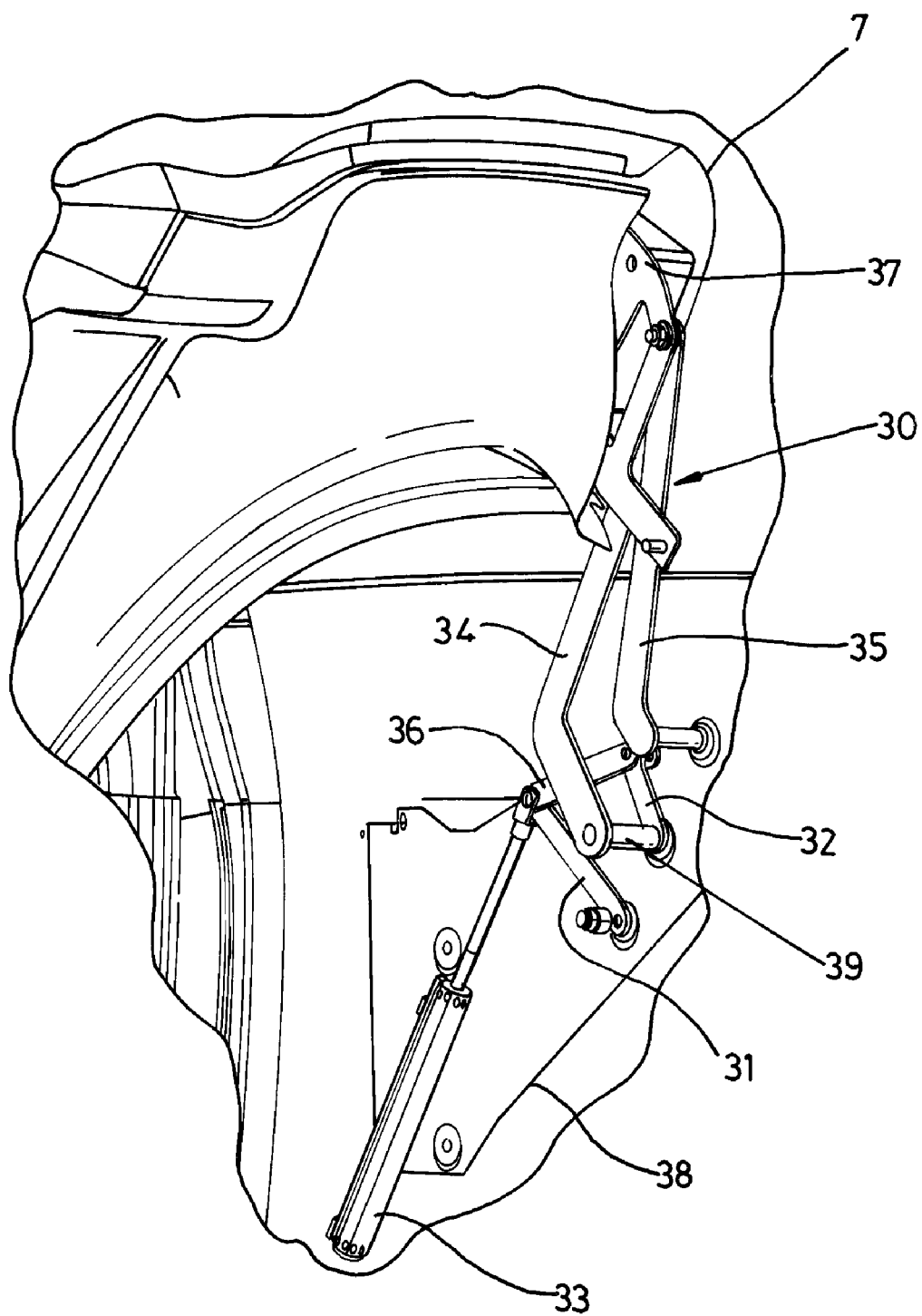
FIG. 17 is a three quarter rear view of the rear roof stowage mechanism in the position shown in FIG. 16.

With particular reference to FIGS. 16 and 17 there is shown in greater detail the right hand side rear roof panel stowage mechanism 30 forming one of a pair of stowage mechanisms used to reversibly move the rear roof panel 7 between its in use and stowed positions.

The rear roof stowage mechanism 30 comprises of a first rear roof support arm 34, a second rear roof support arm 35 which form in combination with a rear roof mounting bracket 37 and a support plate 38 a primary four bar linkage between the main body structure and the rear roof panel, a secondary four bar linkage comprised of a first drive arm 31, a link arm 36 connecting the first drive arm 31 to a second drive arm 32 and the support plate 38 and a linear actuator 33.

The support plate 38 is fastened to part of the main body structure of the motor vehicle 5 of which it forms a part and the rear roof mounting bracket 37 is fastened to the rear roof panel 7.

The first and second elongate rear roof support arms 34 and 35 have respective first ends which are pivotally attached to the rear roof mounting bracket 37 and have respective second ends which are pivotally attached to the support plate 38.

The first drive arm 31 has a first end pivotally connected at a first pivot point to a piston rod of the linear actuator 33 and a second end pivotally connected at a second pivot point to the support plate 38.

The link arm 36 is drivingly connected at a first end to the piston rod of the linear actuator 33 and is drivingly connected at a second end to the second drive arm 32.

The second drive arm 32 has a first end drivingly connected at a first pivot point to the link arm 36 and a second end pivotally connected at a second pivot point to support plate 38.

The distance between the first and second pivot points of the second drive arm 32 is less than the distance between the first and second pivot points of the first drive arm 31 so that when the first drive arm 31 is rotated by the linear actuator 33 a specific amount the second drive arm 32 will be rotated a greater amount. That is to say the secondary four bar linkage amplifies the displacement of the piston rod of the linear actuator 33.

The second drive arm 32 is drivingly connected to the first rear roof support arm 34 of the primary four bar linkage by a drive shaft 39 to which both of the arms 32, 34 are fastened. The drive shaft 39 is rotatably supported at one end by the support plate 38.

The lengths of the first and second rear roof support arms 34 and 35 of the primary four bar linkage are such that movement of the rear roof panel 7 from the in use position to the stowed position causes a front edge of the rear roof panel to rotate downwardly as the rear roof panel 7 is moved to the stowed position. That is to say, the first and second rear roof support arms 34 and 35 are connected to the rear roof mounting bracket 37 at respective first pivot points and are connected to the support plate 38 at respective second pivot points and the distance between the first and second pivot points of the first rear roof support arm 34 is less than the distance between the first and second pivot points of the second rear roof support arm 35.

Operation of the rear roof panel stowage mechanism 30 will now be described with reference to FIGS. 5 to 9 and FIGS. 16 and 17.

Figure 5:
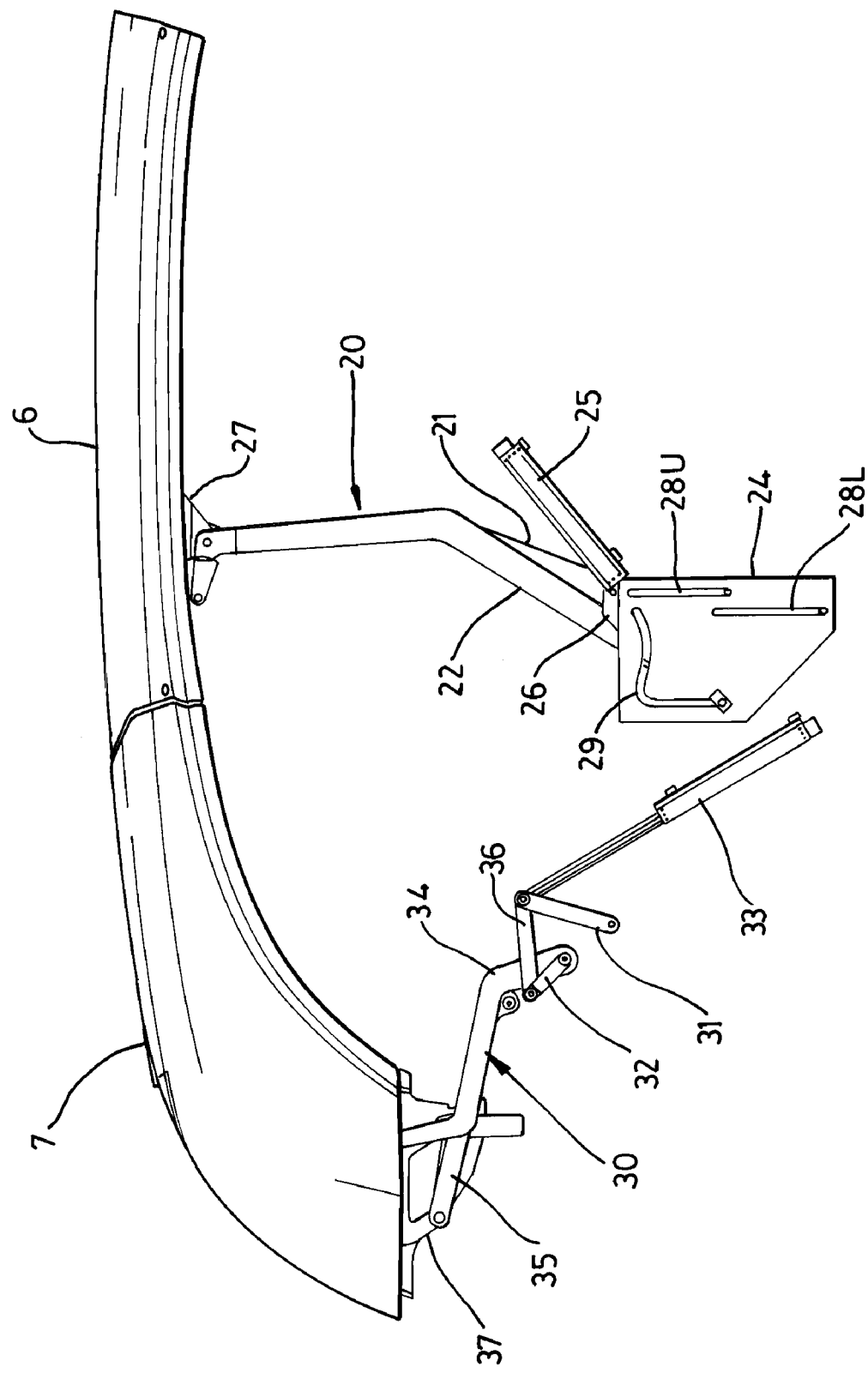
FIG. 5 is a right hand side view of respective right hand side front and rear stowage mechanisms shown in the positions they adopt when the front and rear roofs are both in the 'in use' positions shown in FIG. 1.

As shown in FIG. 5 the rear roof panel 7 is in its in use position and a front edge of the rear roof panel 7 is sealingly engaged with the rear end of the front roof panel 6 such that the rear end of the front roof panel 6 lies upon the front end of the rear roof panel 7. To stow the rear roof panel 7 the first step is to raise the front roof panel 6 as has been described above. When the front roof panel 6 has been moved to its raised position as shown in FIG. 6 the rear roof panel 7 can then be moved from it in use position.

This is achieved by operating the linear actuator 33 which is controlled by the electronic control unit and is connected to a source of fluid pressure. The linear actuator 33 is a double acting actuator which is to say the piston rod of the linear actuator 33 is powered in both directions.

To move the rear roof panel 6 from its in use position the linear actuator 33 is operated so as to retract the piston rod which will cause the first drive arm 31 to rotate and via the link arm 36 the second drive arm 32 is also rotated. Because the second drive arm 32 is drivingly connected to the first rear roof support arm 34 by the drive shaft 39 the first rear roof support arm 34 is also rotated causing the rear roof panel 7 to be moved and will move under the rear end of the raised front roof panel 6.

This forward and downward rotation of the rear roof panel 7 will continue until the piston rod of the linear actuator 33 is retracted to a position corresponding to the stowed position of the rear roof panel 7. The retraction of the linear actuator 33 is halted by the electronic control unit when the piston rod reaches the end of its travel or when it is determined that the rear roof panel 7 is in its stowed position. This can be established by the use of one or more micro-switches, by the use of one or more pressure transducers to monitor the pressure of the fluid being supplied to the linear actuator 33 or by any other convenient means.

Figure 7:
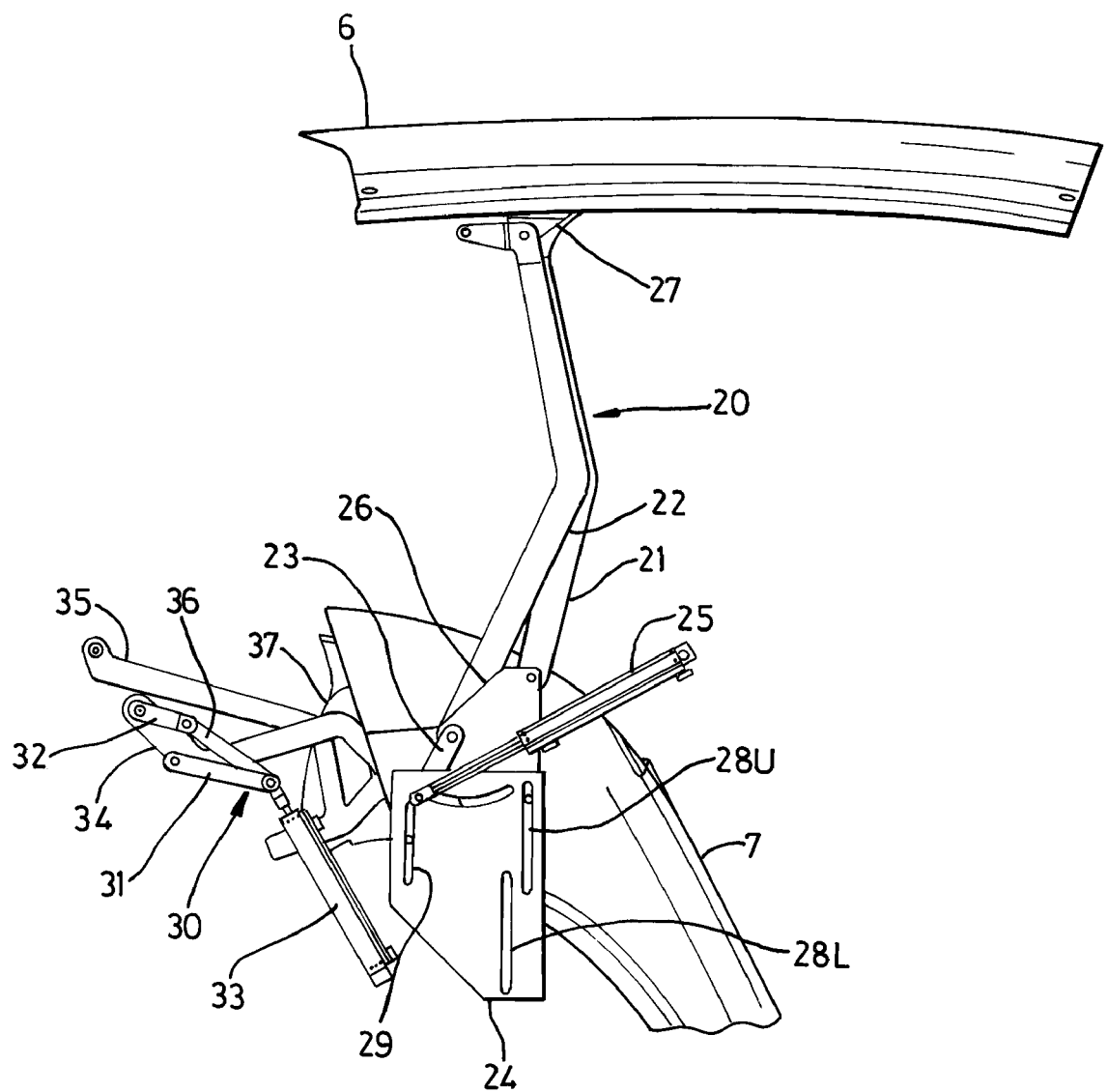
FIGS. 7 and 8 show the positions of the front and rear stowage mechanisms at further steps in the transformation process.

Due to the respective lengths of the first and second rear roof support arms 34, 35 the rear roof panel 7 is rotated forwardly and lowered as it is moved from its in use position as can be seen with reference to FIGS. 6 and 7.

When the rear roof panel 7 is in it stowed position it is vertically inclined that is to say, an upper surface of the rear roof panel 7 that, when the rear roof panel 7 is in it in use position, is substantially horizontally disposed is now disposed at an angle which is close to vertical.

In practice it is desirable to arrange the angle of this vertical inclination to be the same as the vertical inclination of the backrests fitted to the front row of seats 9 and it is preferable that the inclination of the front row of seats 9 be limited by an end stop or the position be controlled so that the backrests are moved automatically into a predetermined vertical inclination when transformation of the vehicle 5 from the hatchback style is started. In a preferred embodiment both the inclination of the backrests and the fore-aft positioning of the front row of seats 9 within the passenger compartment is automatically set when the transformation to the convertible vehicle style is started.

It will be noted that, when in the stowed position, the rear roof panel 7 is located between the front and rear rows of seats 9 and 10 and partially overlies the rear row of seats 10 so as to partly obscure them from view.

The process is reversible by using the electronic control unit to cause fluid to be supplied to the linear actuator 33 to cause the piston rod to be extended thereby returning the rear roof panel 7 to its in use position.

On of the advantages of using a stowage mechanism as described above for the rear roof panel 7 is that the mechanism is relatively compact and allows the use of a linear actuator with a small stroke to produce a relatively large movement of the rear roof panel 7.

Figure 18:
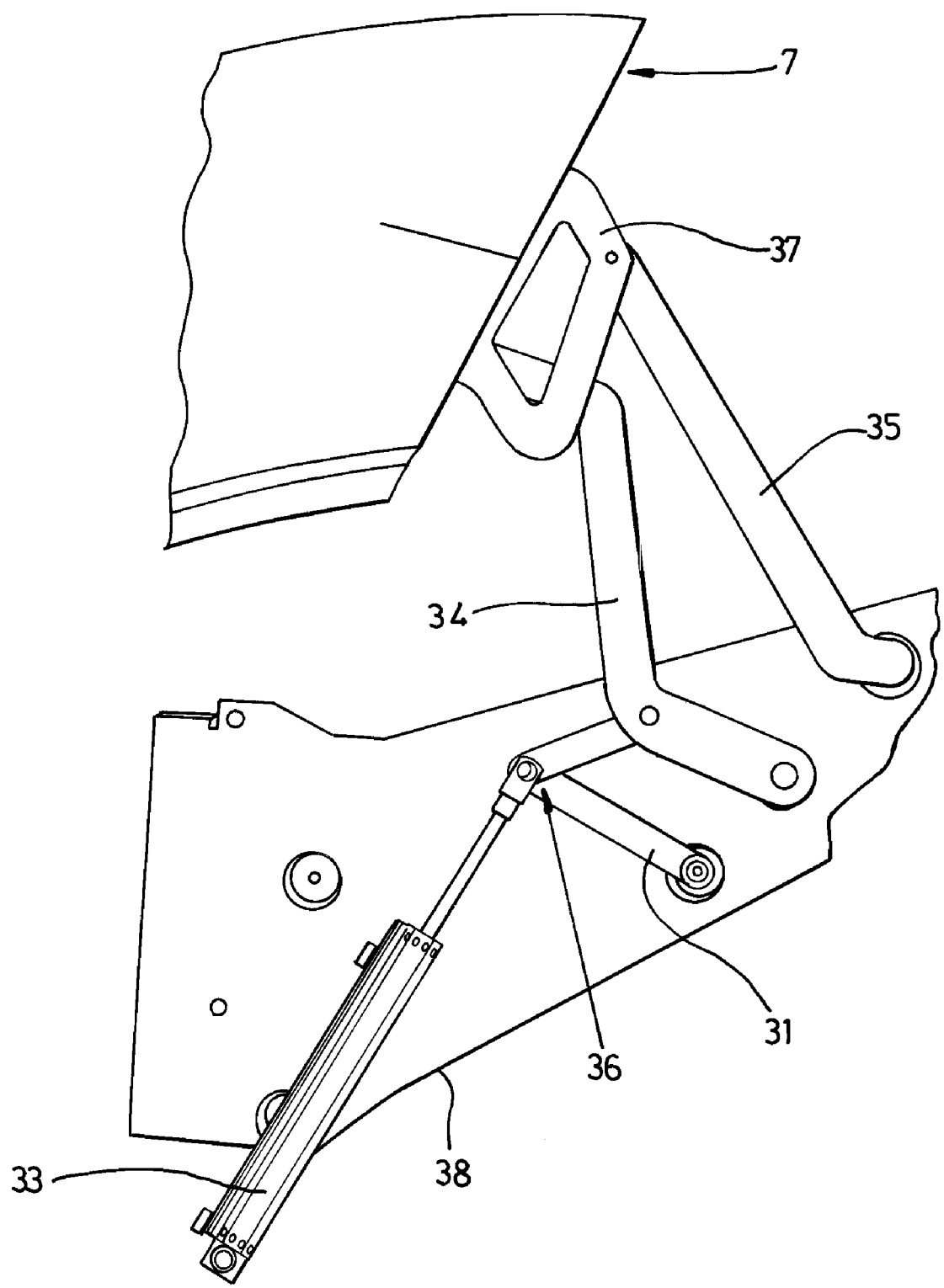
FIG. 18 is a left hand view of an alternative right hand rear roof stowage mechanism to that shown in FIGS. 16 & 17 showing the alternative stowage mechanism in the same position as the stowage mechanism shown in FIGS. 16 and 17.

With reference to FIG. 18 there is shown a second embodiment of stowage mechanism for the rear roof panel 7 which is in most respects identical to that previously described and operates in the same manner as that previously described.

The only significant difference between this second embodiment and the embodiment previously described is that the second drive arm is formed not by a separate arm but by a portion of the first rear roof support arm 34 of the primary four bar linkage. This is achieved by drivingly connecting the link arm 36 directly to the first rear roof support arm 34 at a small distance from the position where the first rear roof support arm 34 is pivotally connected to the support plate 38.

As before the distance between the point of connection of the link arm 36 to the first rear roof support arm 34 and the position of pivotal connection of the first rear roof support arm 34 to the support plate 38 is less than the distance between the first and second pivot points of the first drive arm 31 so that when the first drive arm 31 is rotated by the linear actuator 33 a specific amount the first rear roof support arm 34 will be rotated a greater amount.

With reference to FIGS. 19 to 22 there are shown some alternative actuator means for the rear roof stowage mechanism. In all cases the rear roof stowage mechanism 30 comprises as before of the first rear roof support arm 34, the second rear roof support arm 35 which form in combination with the rear roof mounting bracket 37 and the support plate 38 a primary four bar linkage between the main body structure and the rear roof panel 7 but in these cases there is no secondary four bar linkage.

Figure 19:
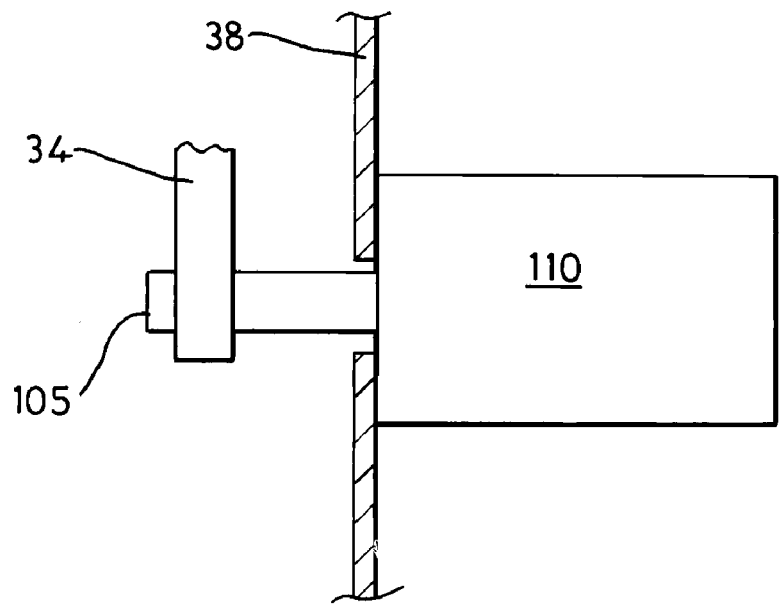
FIGS. 19 to 22 show some alternative actuator means for the rear roof stowage mechanism.

With particular reference to FIG. 19 there is shown an actuator means comprising of a rotary actuator 110 that can be an electric motor or a hydraulic motor having a rotatable output shaft 105. The rotary actuator 110 is fastened to the support plate 38 and the first rear support arm 34 is fastened directly to the rotatable output shaft 105 of the rotary actuator 110. Therefore rotation of the rotatable output shaft 105 will rotate the first rear support arm 34 to move the rear roof panel 7 between the in use and stowed positions. It will be appreciated that the rotary actuator 110 may include internal gearing to increase the torque output therefrom.

Figure 20:
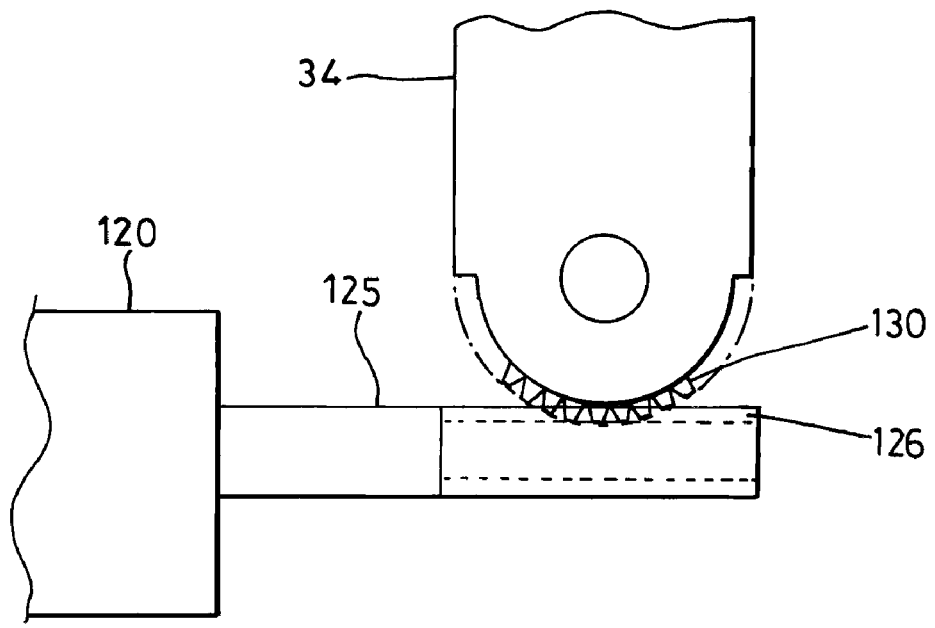

With particular reference to FIG. 20 there is shown an actuator means comprising of a rotary actuator 120 that can be an electric motor or a hydraulic motor having a rotatable output shaft 125. The rotatable shaft 125 has a worm gear 126 formed thereon for engagement with teeth 130 formed around the second end of the first rear support arm 34. Therefore rotation of the rotatable output shaft 125 will, due to the interengagement of the worm gear 126 and the teeth 130, rotate the first rear support arm 34 to move the rear roof panel 7 between the in use and stowed positions. It will be appreciated that the worm gear could be replaced by a conventional gear wheel and that the rotary actuator 120 may include internal gearing to increase the torque output therefrom.

Figure 21:
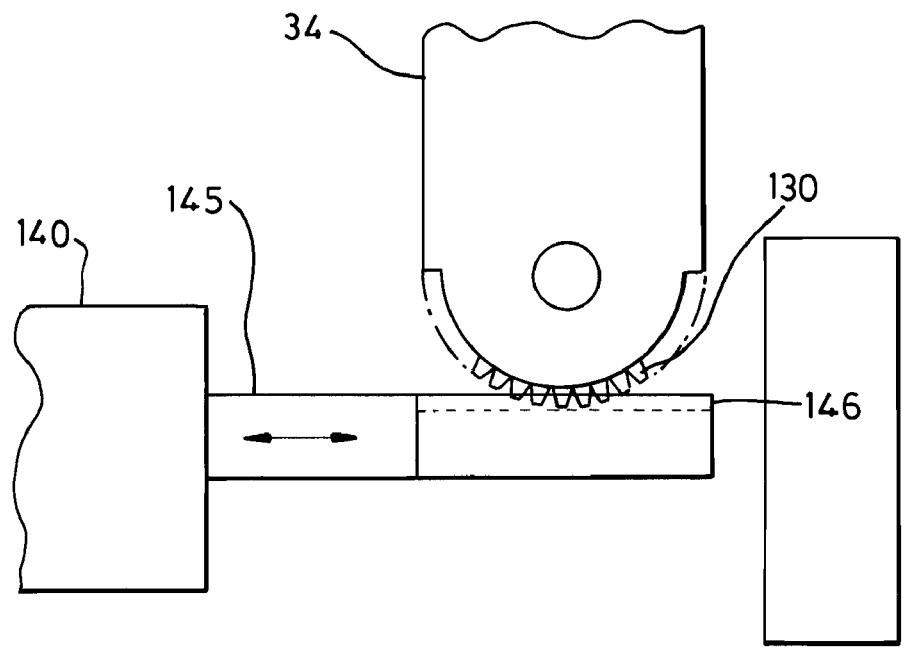

With particular reference to FIG. 21 there is shown an actuator means comprising of a linear actuator or ram 140 having a piston rod 145. The piston rod 145 has a number of teeth 146 formed thereon for engagement with teeth 130 formed around the second end of the first rear support arm 34. Therefore in and out linear movement of the piston rod 146 will, due to the interengagement of the teeth 146 and the teeth 130, rotate the first rear support arm 34 to move the rear roof panel 7 between the in use and stowed positions.

Figure 22:
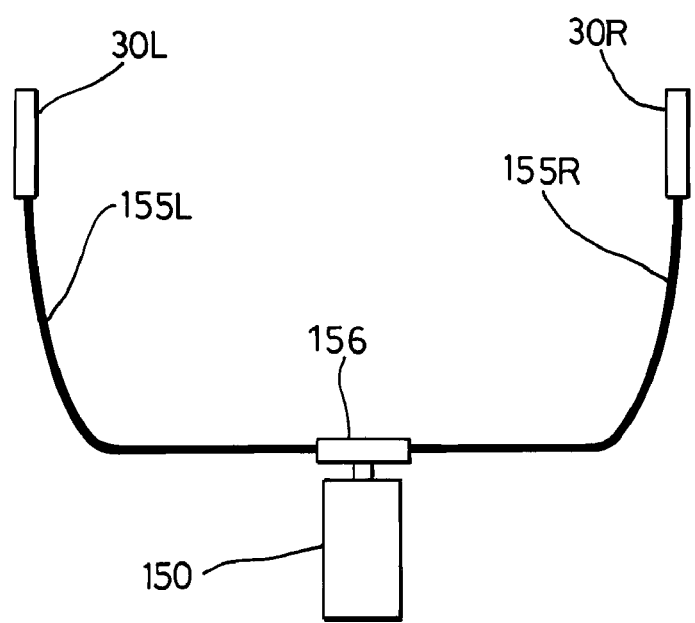

With particular reference to FIG. 22 there is shown an actuator means which uses only one rotary actuator 150 such as an electric or hydraulic motor to operate both a left hand side rear roof stowage mechanism 30L and a right hand side rear roof stowage mechanism 30R.

The rotary actuator 150 has a rotatable output shaft (not shown) which is driveably connected via a 'Tee' or splitter drive unit 156 to two drive links 155L and 155R. Each of the drive links 155L, 155R which can be flexible drive links is connected by a geared drive to a respective first rear support arm (not shown) of the stowage mechanism 30L, 30R for which it provides drive. Therefore rotation of the rotatable output shaft of the rotary actuator 150 will, due to the driveable connection provided by the two links 155L, 155R, drive both of the stowage mechanisms 30L, 30R so as to rotate the respective first rear support arms to move the rear roof panel 7 between the in use and stowed positions.

Although the invention has been described with reference to a hatchback style of vehicle having two rows of seats it could be applied to other types of two box motor vehicle such as an MPV or estate style. In these cases the rear roof member will still be stowed within the passenger compartment but may be stowed behind a second row of seats if the vehicle has three rows of seats and the front roof member may comprise of more than one panel so that one of the panels stows as described above onto a rear part of the vehicle and the other panel stows in some other manner or is removable from the vehicle. Therefore, for example, a MPV style of vehicle having three rows of seats can be transformed into a convertible having two rows of seats or into a pick-up having two rows of seats.

It will be appreciated by those skilled in the art that, although the invention has been described with reference to one or more preferred embodiments, the invention is not limited to these disclosed embodiments and that various alternative embodiments or modifications to the disclosed embodiments could be made without departing from the scope of the invention.

What is claimed is:

1. A motor vehicle having a body structure including a rear roof panel which is moveable from an in use position to a stowed position by a pair of stowage mechanisms and at least two rows of seats each having a seat cushion and a backrest, wherein the rear roof panel is rotated forwardly and moved downwardly as it is moved from the in-use position to the stowed position so that, when in the stowed position, the rear roof is located in an area between seat cushions in two of the at least two rows of seats, wherein each of the stowage mechanisms comprises a pivotal linkage pivotably attached to the body structure of the motor vehicle at at least one fixed pivot point.

2. A motor vehicle having a body structure including a rear roof panel which is moveable from an in use position to a stowed position by a pair of stowage mechanisms and at least two rows of seats wherein the rear roof panel is rotated forwardly and moved downwardly as it is moved from the in-use position to the stowed position so that, when in the stowed position, the rear roof is located between two of the at least two rows of seats, wherein each of the stowage mechanisms comprises first and second elongate arms which are pivotally attached at respective first ends to a respective side of the rear roof panel and are pivotally attached at respective second ends to part of the body structure of the motor vehicle so as to form a primary four bar linkage between the body structure and the rear roof panel and an actuator means driveably attached to one of the first and second arms to reversibly move the rear roof panel between its in use and stowed positions by rotation of the respective arm to which it is attached about its respective second end.

3. A motor vehicle as claimed in claim 2 wherein the lengths of the first and second arms of the primary four bar linkage are such that movement of the rear roof panel from the in use position to the stowed position causes a front edge of the rear roof panel to rotate downwardly as the rear roof panel is moved to the stowed position.

4. A motor vehicle as claimed in claim 3 wherein the first and second arms are connected to the rear roof panel at respective first pivot points and are connected to the body structure at respective second pivot points and the distance between the first and second pivot points of the first arm is less than the distance between the first and second pivot points of the second arm.

5. A motor vehicle as claimed in any of claims 2 to 4 wherein the actuator means comprises a linear actuator and a secondary four bar linkage to driveably connect the linear actuator to said one of the first and second arms.

6. A motor vehicle as claimed in claim 5 in which the secondary four bar linkage comprises a first drive arm having a first end pivotally connected at a first pivot point to the linear actuator and a second end pivotally connected at a second pivot point to part of the body structure of the motor vehicle, a link arm drivingly connected at a first end to the linear actuator and drivingly connected at a second end to a second drive arm having a first end drivingly connected at a first pivot point to the link arm and a second end pivotally connected at a second pivot point to part of the body structure of the motor vehicle, wherein the distance between the first and second pivot points of the second drive arm is less than the distance between the first and second pivot points of the first drive arm.

7. A motor vehicle as claimed in claim 6 wherein the second drive arm is drivingly connected to the first arm of the primary four bar linkage.

8. A motor vehicle as claimed in claim 7 wherein the second drive arm is formed by a portion of the first arm of the primary four bar linkage.

9. A method for converting a two box motor vehicle having at least two rows of seats, each seat having a seat cushion and a backrest, a moveable front roof panel and a moveable rear roof panel into an alternative style of motor vehicle wherein the method comprises moving the rear roof panel from an in use position to a stowed position in which it is located in an area between seat cushions of two of the at least two rows of seats by rotating it forwardly and moving it downwardly, wherein the rear roof panel is connected by a pivotal linkage pivotably attached to part of a body structure of the motor vehicle at at least one fixed pivot point.

10. A method as claimed in claim 9 wherein the method further comprises raising the front roof panel from an in use position to a raised position so that the rear roof panel can pass under the front roof panel into the stowed position.

11. A method for converting a vehicle into an alternative style comprising raising a front roof panel from an in use position to a raised position and then moving a rear roof panel front end forwardly from an in use position downwardly via a mechanism so that the rear roof panel can pass under the front roof panel into a stowed position in which it is located between two of at least two rows of seats wherein each seat in the two rows of seats comprises a seat cushion and a backrest, and wherein the rear roof is located in an area between seat cushions of seats in the two of at least two rows of seats when in the stowed position.

12. A vehicle comprising a rear roof panel movable via a mechanism from an in use position to a stowed position, wherein a front roof panel is raised and then the rear roof panel is rotated front edge forwardly and moved downwardly via the mechanism such that the rear roof passes under the raised front roof panel as it is moved from the in use position to the stowed position so that, when in the stowed position, the rear roof is located between two of at least two rows of seats wherein each seat in the two rows of seats comprises a seat cushion and a backrest, and wherein the rear roof is located in an area between seat cushion of seats in the two of at least two rows of seats.

13. The vehicle as claimed in claim 12 wherein the rear roof is disposed at an angle which is close to vertical when in the stowed position.

14. The method as claimed in claim 11 wherein the rear roof is disposed at an angle which is close to vertical when in the stowed position.

15. The motor vehicle as claimed in claim 1 wherein the rear roof is disposed at an angle which is close to vertical when in the stowed position.

16. The method as claimed in claim 9 wherein the rear roof is disposed at an angle which is close to vertical when in the stowed position.

17. A method for converting a vehicle into an alternative style comprising raising a front roof panel from an in use position to a raised position and then moving a rear roof panel from an in use position downwardly via a mechanism so that the rear roof panel can pass under the front roof panel into a stowed position which is substantially vertically inclined and located between two of at least two rows of seats.

* * * * *